(12) United States Patent
Takahashi

(10) Patent No.: US 8,192,284 B2
(45) Date of Patent: Jun. 5, 2012

(54) METHOD, STORAGE MEDIUM, AND APPARATUS FOR GENERATING IMAGE OF VIRTUAL SPACE

(75) Inventor: Keita Takahashi, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 148 days.

(21) Appl. No.: 12/633,834

(22) Filed: Dec. 9, 2009

(65) Prior Publication Data

US 2010/0087248 A1    Apr. 8, 2010

Related U.S. Application Data

(63) Continuation of application No. 10/370,560, filed on Feb. 24, 2003, now Pat. No. 7,651,396.

(30) Foreign Application Priority Data

Feb. 28, 2002   (JP) .................................. 2002-055112

(51) Int. Cl.
*A63F 13/00*    (2006.01)
*A63F 9/24*    (2006.01)

(52) U.S. Cl. .................. 463/33; 463/1; 463/30; 463/31; 463/32; 345/418; 345/419; 345/629

(58) Field of Classification Search .......... 463/1, 30–33; 345/418, 419, 629
See application file for complete search history.

(56) References Cited

U.S. PATENT DOCUMENTS

| | | | |
|---|---|---|---|
| 4,822,045 A | 4/1989 | Shoemaker, Jr. | |
| 5,415,549 A | 5/1995 | Logg | |
| 5,528,265 A | 6/1996 | Harrison | |
| 6,354,944 B1 * | 3/2002 | Takahashi et al. | .............. 463/32 |
| 6,379,250 B2 | 4/2002 | Adamczyk et al. | |
| 6,404,436 B1 * | 6/2002 | Goden | .......................... 345/473 |
| 6,629,892 B2 | 10/2003 | Oe et al. | |

FOREIGN PATENT DOCUMENTS

| | | |
|---|---|---|
| JP | A-01-129319 | 5/1989 |
| JP | A-07-085312 | 3/1995 |

(Continued)

OTHER PUBLICATIONS

Nintendo of America Inc., Super Mario Bros. 3: Instruction Booklet, 1990, p. 1-44.*

(Continued)

*Primary Examiner* — Dmitry Suhol
*Assistant Examiner* — Ryan Hsu
(74) *Attorney, Agent, or Firm* — Oliff & Berridge, PLC

(57) ABSTRACT

A method for executing a game having a motif of rolling an object combined with another object with which the object is contacted, on a surface of the object, and growing large like a snowball. The method has: controlling a rotation and a movement of a first object as an operated object, in a virtual space; combining one of a plurality of second objects, with which the operated object is contacted, around a contact position of the operated object, at which the operated object is contacted with the one of the second objects, when the operated object is contacted with the one of the second objects; and determining the operated object with which the one of the second objects is combined, and the one of the second objects, when the one of the second objects is combined with the operated object, as an operated object, newly.

10 Claims, 30 Drawing Sheets

FOREIGN PATENT DOCUMENTS

| | | |
|---|---|---|
| JP | A-07-244747 | 9/1995 |
| JP | A-08-229237 | 9/1996 |
| JP | A-08-229238 | 9/1996 |
| JP | A-09-167050 | 6/1997 |
| JP | A-11-235466 | 8/1999 |
| JP | A-2000-113225 | 4/2000 |
| JP | A-2000-182007 | 6/2000 |
| JP | A-2001-029652 | 2/2001 |
| JP | A-2001-062141 | 3/2001 |
| JP | A-2001-067494 | 3/2001 |
| JP | A-2001-170358 | 6/2001 |
| JP | A-2001-170385 | 6/2001 |
| JP | A-2001-351123 | 12/2001 |
| JP | A-2002-018125 | 1/2002 |
| JP | A-07-116343 | 5/2005 |

OTHER PUBLICATIONS

Taito Corporation, Super Bust-A-Move, © 2000, Acclaim, p. 1-16.
"Book to Understand XI Jumbo in Detail", 2000.
"They Playstation BOOKS, Namco Museum vol. 3 Perfect Guide", 1996, with partial translation.
Smith, Josh, "FIFA 99", www.gamespot.com [retrieved on (Apr. 24, 2007) published on [Dec. 9, 1998]. Retrived from URL: <www.gamespot.com/pc/sports/fifa99/review.html>.
GAMEST, Jan. 30-Feb. 15 double number, Japan, Shinseisha, vol. 12/No. 2 (Feb. 15, 1997), p. 241.
Desselock, Diablo II: Review, Jul. 7, 2000, www.gamespot.com, retrieved from URL <https://www.gamespot.com/pc/rpg/diablo2/review.html>.

* cited by examiner

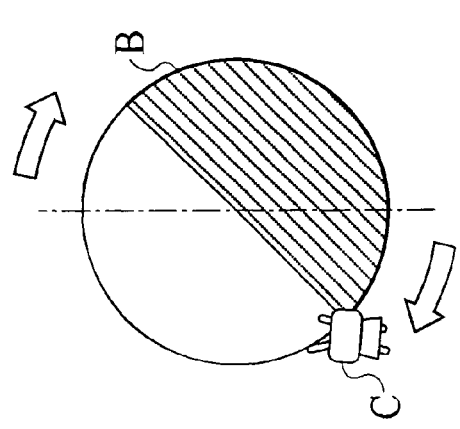
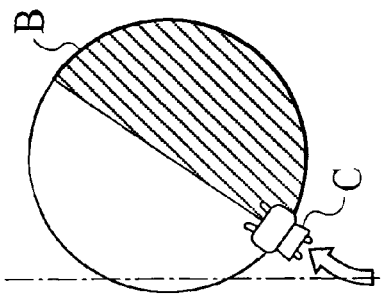
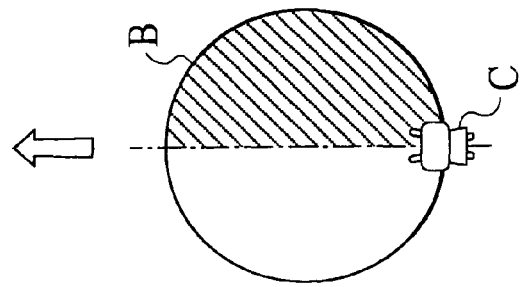
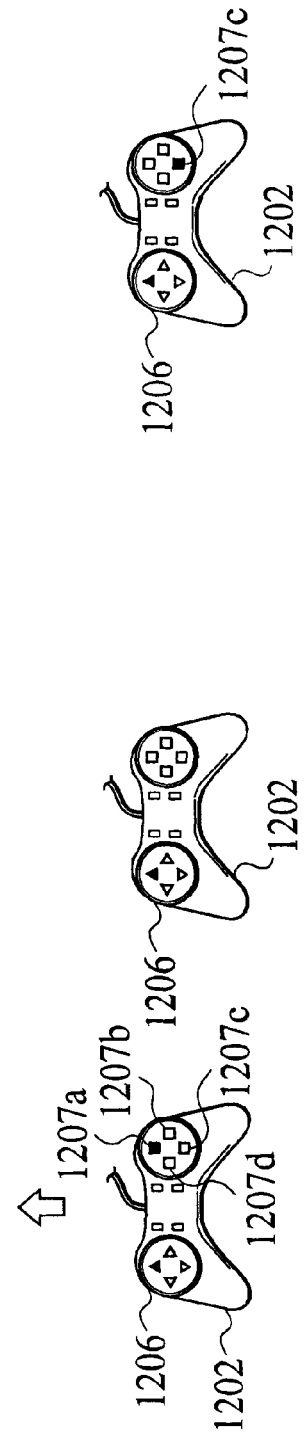

| BALL SIZE RANGE | PROPER DETERMINED VALUE | DISPLAY LEVEL |
|---|---|---|
| 0.5~1.5 | VIEW 1 | 1 |
| ~3 | VIEW 2 | 2 |
| ~5 | VIEW 3 | 3 |
| ~10 | VIEW 4 | 4 |
| ~20 | VIEW 5 | 5 |

532-1 is the Ball Size Range column, 532-2 is the Proper Determined Value column, 532-3 is the Display Level column, and 532 refers to the overall table.

| DISPLAY DETERMINATION DATA | | 76 |
|---|---|---|
| OBJECT DISPLAY LEVEL DETERMINED VALUE | 2 | 761 |
| DISPLAY FLAG | 1 | 762 |

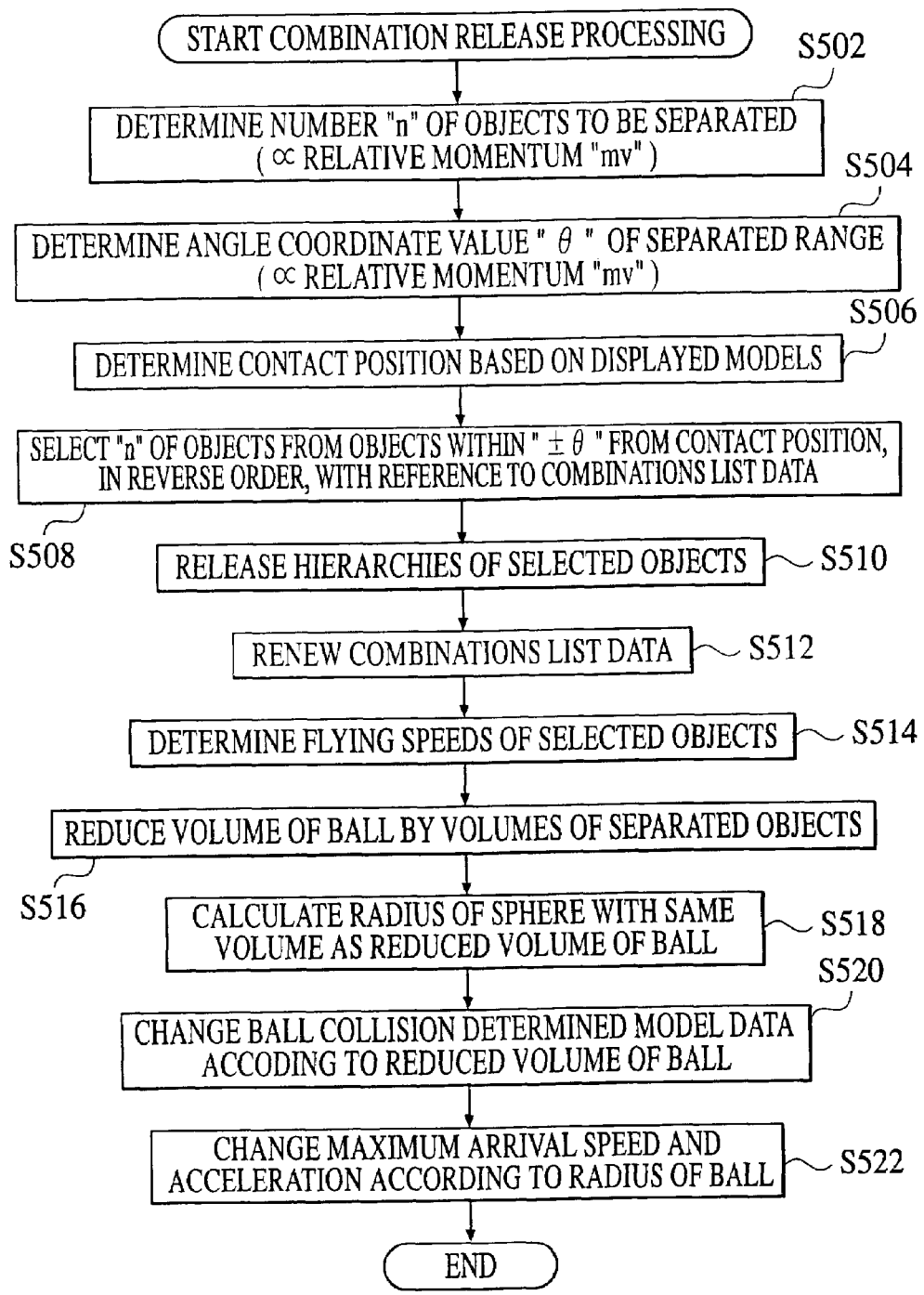

US 8,192,284 B2

METHOD, STORAGE MEDIUM, AND APPARATUS FOR GENERATING IMAGE OF VIRTUAL SPACE

This is a Continuation of application Ser. No. 10/370,560 filed Feb. 24, 2003. The disclosure of the prior application is hereby incorporated by reference herein in its entirety.

BACKGROUND OF THE INVENTION

1. Field of the Invention

The invention relates to a method, a storage medium, an apparatus, a data signal and a program for generating an image of a virtual space.

2. Description of Related Art

Conventionally, many types of games have been developed. One of the types of games is called an action adventure game. The action adventure game is a game wherein a player operates an own character, so that the own character dodges or eliminates obstacles or attacks of opponent characters and runs through a predetermined stage within a limited time. The player makes full use of operation technique of the own character, makes the own character run with skipping or jumping through the stage, and thereby feels refreshed. Therefore, the player competes with another character for a score according to the time to clear the stage, the number of items obtained in the stage, or the like.

In almost all of the conventional action adventure games, the own character operated by the player is determined as a motif that is a protagonist (in a case, a machine controlled by the protagonist, or the like) of a story of the game, so that the own character by itself runs through the stage. Although the stories of the games are determined so as to differ from each other, there is no large difference in the development of the game, wherein the own character dodges or eliminates obstacles or attacks of opponent characters and progresses in the game.

SUMMARY OF THE INVENTION

The present invention was developed in view of the above-described problems.

It is an object of the present invention to provide a method, a storage medium, an apparatus, a data signal and a program for executing a game having a motif of rolling an object which is combined with another object with which the object is contacted, on a surface of the object, and grows large like a snowball.

In accordance with a first aspect of the present invention, a method for determining a virtual space in which a plurality of objects including a first object and a plurality of second objects are provided, generating an image of the virtual space viewed from a predetermined viewpoint, and executing a predetermined game, comprises: controlling a rotation and a movement of the first object (for example, a ball B shown in FIG. 2) as an operated object, in the virtual space; combining one of the second objects, with which the operated object is contacted, around a contact position of the operated object, at which the operated object is contacted with the one of the second objects (for example, objects E shown in FIG. 2), when the operated object is contacted with the one of the second objects; and determining the operated object with which the one of the second objects is combined, and the one of the second objects, when the one of the second objects is combined with the operated object, as an operated object, newly.

In accordance with a second aspect of the present invention, a game apparatus for determining a virtual space in which a plurality of objects including a first object and a plurality of second objects are provided, generating an image of the virtual space viewed from a predetermined viewpoint, and executing a predetermined game, comprises: a rotation control section for controlling a rotation and a movement of the first object as an operated object, in the virtual space; a combination section for combining one of the second objects, with which the operated object is contacted, around a contact position of the operated object, at which the operated object is contacted with the one of the second objects, when the operated object is contacted with the one of the second objects; and a determination section for determining the operated object with which the one of the second objects is combined by the combination section, and the one of the second objects, when the one of the second objects is combined with the operated object, as an operated object, newly.

The first object is an object operated by a player. For example, the first object may be a hero, a thing pushed by the hero, a machine operated by the hero, an opponent character or the like, and may be determined as the occasion may demand. The first object moves in the game space, by rotating in a moving direction. That is, the first object moves in the game space, as if the first object rotates (Hereinafter, it will be "rolling").

When the first object rolling in the game space is contacted with the second object, the second object is combined around the contact position of the first object. The contact means a state it is seen that the first object is contacted with the second object on a game screen. When the second object is combined around the contact position, the first object and the second object are expressed so as to be contacted with each other at the contact position, on the game screen.

When the first object and the second object are combined with each other, the first object with which the second object is combined is processed as an operated object newly. Therefore, the first object with which the second object is combined is processed as an operated object and an combined object.

For example, when the first object is contacted with the second object, the second object is combined with the first object, the operated object is changed to a new operated object, and after the new operated object rolls and is contacted with another object (a third object) in the game space, the third object is combined with the first object with which the second object is combined, and determined to be an new object. Therefore, the game progresses in state the second object and the third object are combined with the first object.

Consequently, according to the method of the first aspect or the apparatus of the second aspect of the present invention, because another object with which the first object as an initial state is contacted, is combined on a surface of the first object, it is possible to realize a new game for enlarging the first object like a snowball.

Further, for example, because it is possible to determine a game story of combining objects of the whole town with the operated object, enlarging the operated object, striking, destroying and crushing an evil secret society building with the operated object, it is possible that a player enjoys taking an unusual destruction which the player cannot take as in the past.

The rotation and the movement are not always limited to a rolling on a ground object in the game space. That is, it is unnecessary to say that the rotation and the movement are managed, for example, in a water, a space, an air or the like, like the game space, if a direction of the rotation of the first object is approximately the same as a direction of the movement of the first object.

Preferably, the method of the first aspect of the present invention, further comprises: determining whether each of the second objects can be combined with the operated object, or not, according to a size of the operated object; wherein the combining one of the second objects includes combining one of the second objects, which is determined that the one of the second objects can be combined with the operated object, with the operated object, when the operated object is contacted with the one of the second objects.

The above-described size of the operated object is a predetermined value showing a magnitude of the operated object. For example, the size means a predetermined value of a physical quantity such as a measure of a form, a weight or the like, of the operated object. In case the size is a measure of a form of the operated object, for example, when the operated object is formed in an approximate sphere, or an approximate cylinder, the measure corresponds to a diameter or a circumference. When the operated object is formed in an approximately rectangular parallelepiped, the measure corresponds to a length of a side. When the operated object is formed in a complicated projection shape, or a asymmetrical shape, for example, the measure may correspond to a representative measure of an external contact rectangle of an external contact rectangular parallelepiped, a representative measure of an approximate ellipse or an approximately oval column, or the like.

In case the size is a weight of the operated object, for example, when the first object and the second object have determined weights respectively, the weight of the operated object corresponds to the total of the determined weight of the first object, and the determined weight of the second object which is combined with the first object.

Preferably, the method of the first aspect of the present invention, further comprises: determining an attribute of the operated object; and determining whether each of the second objects can be combined with the operated object, or not, according to the attribute of the operated object; wherein the combining one of the second objects includes combining one of the second objects, which is determined that the one of the second objects can be combined with the operated object, with the operates object, when the operated object is contacted with the one of the second objects.

Because each of the second objects is determined whether it can be combined with the operated object or not, suitably, it is possible to obtain an effect like that iron can be combined with a magnetic, but wood cannot be combined with a magnetic. Consequently, according to the above-described method, it is possible to not only obtain the same effect as the method of the first aspect of the present invention, but also generate various states, and provide varied developments of the game.

Preferably, the method as described above, further comprises: deforming the operated object plastically, when the operated object is contacted with one of the second objects, which is determined that the one of the second objects can not be combined with the operated object.

Preferably, the method as described above, further comprises: separating one of the second objects, which is determined that the one of the second objects can not be combined with the operated object, into a plurality of piece objects, when the operated object is contacted with the one of the second objects.

The second object which is determined to be not combined with the operated object, is, for example, a larger object than the operated object.

According to the above-described method, the second object which is determined to be not combined with the operated object functions as an obstacle. Consequently, when the operated object comes into contact with the second object, the operated object is deformed plastically, or separated into piece objects.

When the operated object is deformed by the contact, as a matter of course, the roll of the operated object is affected by the contact. For example, a disadvantage is caused, so that the operated object cannot go on the straight, or move at higher speed. That is, a player must make a plane of avoiding the second object of the size incapable of being combined with the operated object, selecting the second object of the size capable of being combined with the operated object and combining the second object with the operated object.

When the second object is separated into piece objects, in case the second object as it is, is too large to be combined with the operated object, or even if the second object can be combined with the operated object, the second object affects the rolling of the operated object, because the separated piece objects are combined with the operated object, it is possible to combine the second object with the operated object without causing trouble.

Consequently, according to the above-described method, it is possible to not only obtain the same effect as described above, but also provide a penalty condition, and provide a more enjoyable game.

Preferably, the method as described method, further comprises: generating a list (for example, combinations list data 65 shown in FIG. 5) of the second objects which are combined with the operated object; specifying one of the second objects registered in the list, which is to be separated, when the operated object is contacted with one of the second objects, which is determined that the one of the second objects can not be combined with the operated object; and separating the one of the second objects, which is specified to be separated, from the operated object; wherein the determining the operated object with which the one of the second objects is combined, and the one of the second objects, includes determining the operated object from which the one of the second objects is separated, when the one of the second objects is separated from the operated object, as an operated object, newly.

According to the above-described method, in case the operated object comes into collision with an obstacle object (the second object which is determined to be not combined with the operated object), one of the second objects which are combined with the operated is specified and separated on the basis of the list. Consequently, the separated second object is got out of the operated object.

As a result, it is possible to not only obtain the same effect as described above, but also express the state the object which is combined with the operated object is got out of the operated object, by the collision with the operated object.

Preferably, the method of the first aspect of the present invention, further comprises: determining at least one of a speed and a rotation movement radius of the operated object, according to a size of the operated object; wherein the controlling a rotation and a movement of the first object as an operated object, includes controlling the movement of the operated object on the basis of the at least one of a speed and a rotation movement radius of the operated object, determined according to the size of the operated object.

According to the above-described method, it is possible to not only obtain the same effect as described above, but also determine the speed or the rotation movement radius of the operated object, according to the size of the operated object. The rotation movement radius is a radius of a course drawn when the operated object changes the direction, and means a so-called minimum rotation radius.

For example, when the speed is determined to be higher in proportion to the size of the operated object, it is possible to always keep the approximately constant relation between the operation of the player and the movement of the operated object on the game screen, regardless of the size of the operated object, and improve the operation of the game.

Further, when the rotation movement radius is determined to be larger in proportion to the size of the operated object, it is possible to generate a state it is difficult to curve the large operated object, and provide a feeling of the size of the operated object.

Preferably, the method of the first aspect of the present invention, further comprises: providing the viewpoint behind a moving direction of the operated object, and at a position separated by a predetermined distance from the operated object, and changing the predetermined distance and providing the viewpoint according to a size of the operated object.

The operated object is combined with the second object, and grows large, because of the characteristic of the game. Therefore, if the positional relation between the operated object and the viewpoint are fixed, because the ratio of the operated object in the game screen increases, the forward disappears.

According to the above-described method, it is possible to not only obtain the same effect as described above, but also position the viewpoint behind the operated object, and determine the distance between the operated object and the viewpoint on the basis of the size of the operated object. Consequently, because the distance is determined suitably, it is possible to control the rate of the operated object in the game screen, and provide the game screen which the player can operate easily.

Preferably, the method of the first aspect of the present invention, further comprises: determining whether each of the second objects can be displayed or not, according to a size of the operated object; wherein the combining one of the second objects includes combining one of the second objects, which is determined that the one of the second objects can be displayed, with the operated object, when the operated object is contacted with the one of the second objects.

According to the above-described method, it is possible to not only obtain the same effect as described above, but also combine only the first object which is determined to be displayed on the game screen, with the operated object, when the operated object comes into collision with the second object.

Consequently, it is possible to omit displaying the second object which does not affect the rolling of the operated object, because the second object is too small to affect the rolling of the operated object even if the second object is combined with the operated object, and to reduce the processing load. Further, it is possible to prevent innumerable objects like dots from being displayed on the game screen, and control the fine sight of the game screen.

Preferably, the method of the first aspect of the present invention, further comprises: inputting an operation signal; wherein the controlling a rotation and a movement of the first object as an operated object, includes controlling a moving direction of the operated object, on the basis of the operation signal inputted.

According to the above-described method, it is possible to not only obtain the same effect as described above, but also operate the moving direction of the operated object.

For example, when an analog stick is used for inputting the operation signal, it is possible to curve the operated object slightly. When an inclination sensor or an acceleration sensor is used for inputting the operation signal, it is possible to operate the operated object as if a player rolls the operated object with his hand.

Preferably, in the method as described above, the inputting an operation signal includes inputting a first operation signal and a second operation signal, and the controlling a rotation and a movement of the first object as an operated object, includes controlling the moving direction of the operated object, on the basis of a difference between the first operation signal and the second operation signal.

Preferably, the apparatus of the second aspect of the present invention, further comprises: two operation levers for outputting operation signals according to an inclination, wherein the rotation control section controls a moving direction of the operated object on the basis of a difference between the operation signals outputted from the two operation levers.

In case of a game capable of realizing the present invention, most of the operations when playing the game are to input the rolling direction of the operated object. Therefore, when the operations are inputted according to the single operation signal (for example, the moving direction is inputted by one joy stick), the operation when playing the game becomes monotonous. According to above-described method, because the operations are inputted by a plurality of means, it is possible complicate the operations.

For example, when the operated object is regarded as a vehicle having wheels capable of rotating rightward and leftward, and the first operation signal and the second operation signal are regarded as rotating quantities of the right wheel and the left wheel, it is possible to determine the moving direction of the operated object according to the difference between the rotating quantities. In the case, when the quantity of the first operation signal is approximately the same as the quantity of the second operation signal, and the direction of the first operation signal is reverse to the direction of the second operation signal, it is possible to change the direction of the operated object and rotate the operated object around the center, without changing coordinates of the central position of the operated object.

Consequently, according to the above-described method or the above-described apparatus, it is possible to not only obtain the same effect as described above, but also provide variations in the operation of the game.

The means for inputting the operation is not limited to the levers or buttons. For example, preferably, the apparatus as described above, further comprises: a rotating unit (for example, a ball unit 1291 shown in FIG. 20) formed in at least one of an approximate sphere and an approximate cylinder; and a detecting section for supporting the rotating unit so as to rotate, and detecting a rotating quantity and a rotating direction of the rotating unit; wherein the rotation control section controls directions of the rotation and the movement of the operated object, on the basis of the rotating quantity and the rotating direction detected by the detecting section.

According to the above-described apparatus, it is possible to not only obtain the same effect as described above, but also make a player enjoy having a feeling of rolling the operated object because the player operates the unit formed in the approximate sphere or the approximate cylinder.

Preferably, the apparatus as described above, further comprises: a rotation brake section for braking a rotation of the rotating unit; and a rotation brake control section for controlling the rotation brake section, according to at least one of a size and a change in a speed of the operated object.

According to the above-described apparatus, it is possible to not only obtain the same effect as described above, but also simulate a feeling of rolling the operated object in virtual reality, and make a player enjoy having the feeling.

In accordance with a third aspect of the present invention, a storage medium has information recorded thereon, when the information is loaded onto an operating apparatus, the information making the operating apparatus execute any one of the above-described methods.

The storage medium is, for example, a CD-ROM, FD (registered trademark), a MO, a memory card, a DVD, a hard disc, a DAT, an IC memory or the like, of which the operating apparatus can read out data. Further, the storage medium can be connected so as to be attached to and detached from the operating apparatus, or connected to the operating apparatus through a communication line. Accordingly, it is possible to make the operating apparatus show the same effect as the above-described method.

Preferably, the storage medium of the third aspect of the present invention, further has information recorded thereon, when the information is loaded onto the operating apparatus, the information making the operating apparatus measure an inclination of the storage medium, and control a moving direction of the operated object on the basis of the inclination.

Preferably, in the storage medium as described above, the operating apparatus is incorporated in a portable game apparatus, and the storage medium (for example, a memory card 1520 with an inclination sensor shown in FIG. 24) is installed in the portable game apparatus.

According to the above-described storage medium, the inclination of the storage medium, that is, the inclination of the portable game apparatus using the storage medium which is installed in the portable game apparatus, is measured. Then, when the inclination is measured, for example, because the moving direction of the operated object is controlled so that the operated object rolls in the downward, the operated object moves so as to roll on a slope. Consequently, it is possible that a player plays the game with a feeling of rolling the operated object in the portable game apparatus.

In accordance with a fourth aspect of the present invention, a data signal embodied in a carrier wave, comprises information used for executing any one of the above-described methods.

In accordance with a fifth aspect of the present invention, when a program is loaded onto an operating apparatus, the program makes the operating apparatus execute any one of the above-described methods.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIGS. 3A, 3B and 3C are views for explaining examples of methods for operating balls;

FIG. 12 is a flow chart for explaining a flow of a combination release processing;

PREFERRED EMBODIMENTS OF THE INVENTION

[First Embodiment]

Hereinafter, a first embodiment to which the present invention is applied will be explained with reference to FIGS. 1 to 14C, in detail. According to the first embodiment, "a large ball rolling game" will be explained as an example, the large ball rolling game for combining objects other than a ball object as an operated object with a surface of the ball object like a snowball, and competing for the size of the ball object enlarged within a limited time.

The present invention is not limited to the large ball rolling game. For example, it is possible to apply the present invention to a game having a motif of rolling an object, regardless of a character or a story of the game.

[Explanation of Structure]

First, a structure according to the first embodiment, will be explained.

Figure 1:
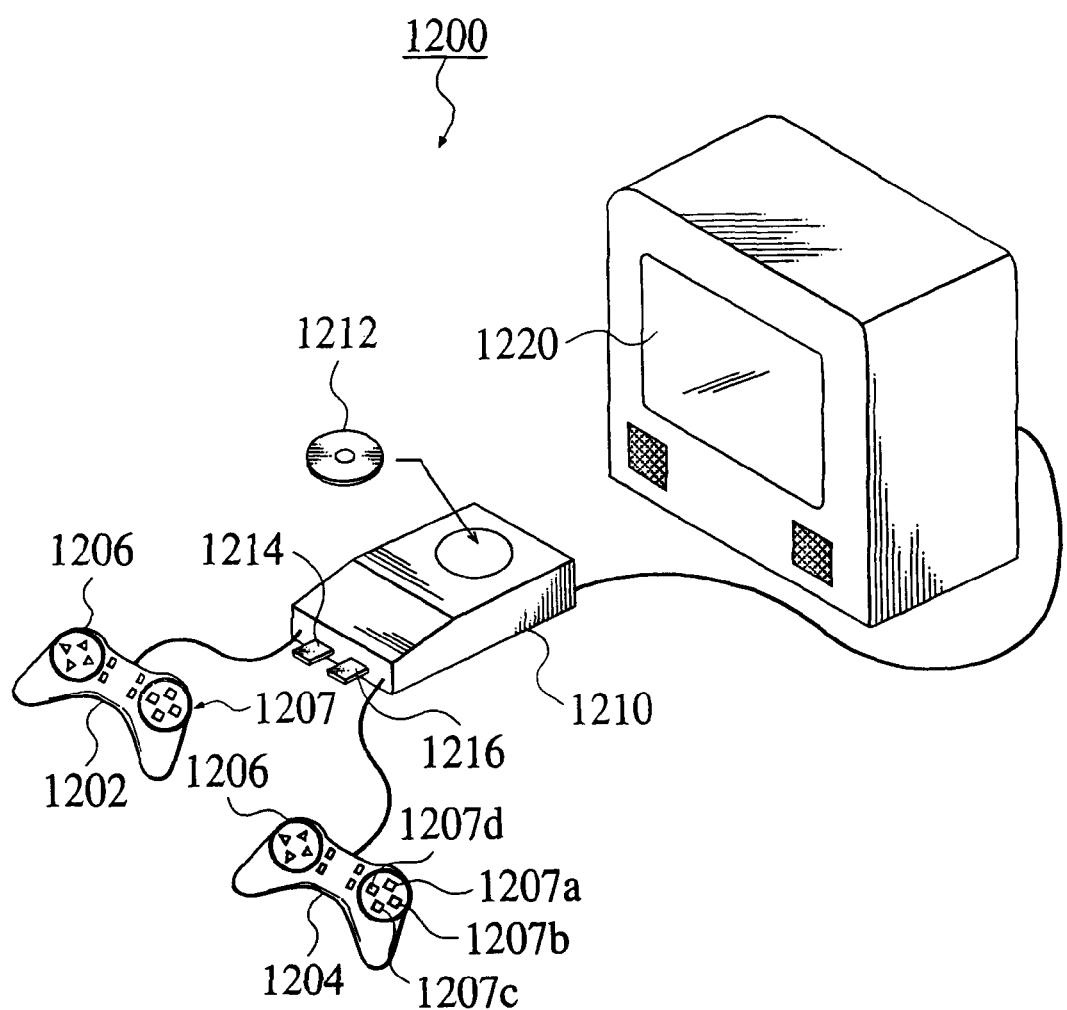
FIG. 1 is a view showing an example of an external appearance of a consumer game apparatus to which the present invention is applied.

FIG. 1 is a view showing an example of an external appearance of a consumer game apparatus 1200 to which the present invention is applied. As shown in FIG. 1, the consumer game apparatus 1200 comprises game controllers 1202 and 1204, and an apparatus body 1210. The consumer game apparatus 1200 is connected to a display 1220.

Game data required to execute a game, such as a game program, game data or the like, are stored in a CD-ROM 1212, an IC memory 1214, a memory card 1216 or the like, as a storage medium which can be attached to and detached from the apparatus body 1210.

The apparatus body 1210 executes various game processing, and makes the display 1220 display game screens thereon, on the basis of the game data read out of the storage medium, and an operation signal inputted through the controller 1202 or 1204.

The player enjoys playing the game by operating a cross key, levers, various types of buttons or the like, provided for the game controller 1202 or 1204, and controlling the movement of the ball object, with watching the game screen displayed on the display 1220.

The game controller 1202 or 1204 is provided with two systems of input means for inputting various directions. In an example shown in FIG. 1, a cross key 1206 and a button group 1207 having buttons arranged in a cross, correspond to the two systems of input means. That is, one system is input means for inputting forward, backward, rightward and leftward directions (or upward, downward, rightward and leftward directions) with the cross key 1206. The other system is input means for inputting forward, backward, rightward and leftward directions with the button group 1207 (the forward direction with a button 1207a, the rightward direction with a button 1207b, the backward direction with a button 1207c, and the leftward direction with a button 1207d). Each of the cross key 1206 and the button group 1207 may have a structure of inputting directions with a lever such as an analogue stick or the like.

[Explanation of Game Contents]

Figure 2A:
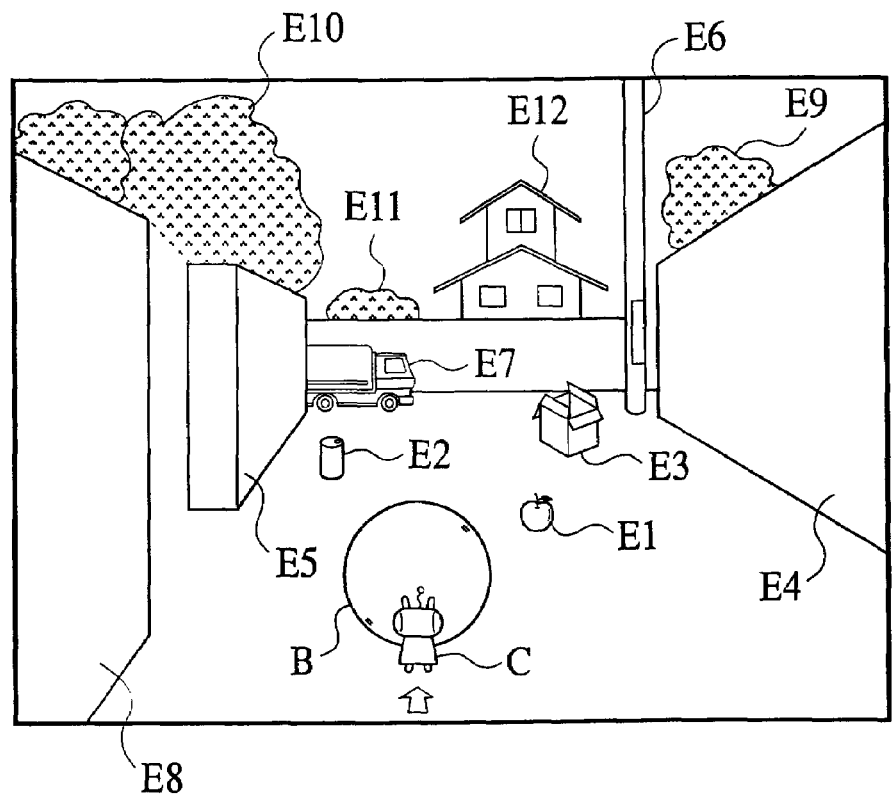
FIGS. 2A and 2B are views showing examples of game images.
Figure 2B:
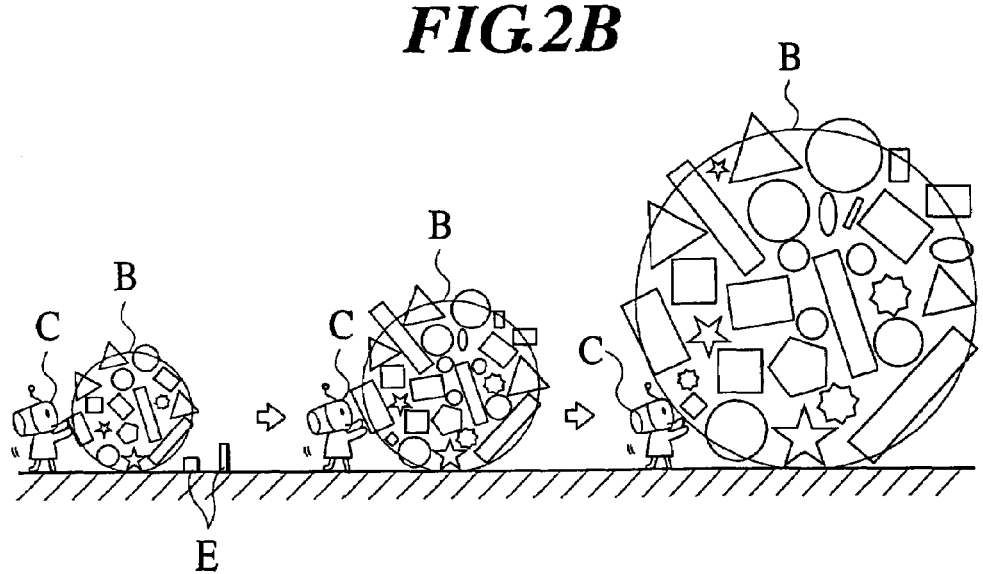

FIGS. 2A and 2B are views showing exemplary game screens generated by the consumer game apparatus 1200. The game screen is displayed, for example, as a 3DCG (three-dimensional computer graphics) image based on polygons of a game space in which objects are provide, viewed from a predetermined view point (a virtual camera).

According to the first embodiment, the player controls a character C, so that the character C walks with rolling a strange ball B with a surface of which objects is combined, when the ball B is contacted with the objects. The ball B corresponds to the operated object, although it is apparently through the character C. The direction in which the character C rolls the ball B is inputted through the cross key 1206 and the button group 1207 of the controller 1202 or 1204.

The player makes the ball B come into collision with objects E provided for the whole town, well, combines the objects E with the surface of the ball B, and enlarges the ball B like the snowball. Although the ball B can be combined with a smaller object than a predetermined size against the size of the ball B, the ball B cannot be combined with a larger object than the predetermined size. For example, in FIG. 2A, because walls E4 and E5, a utility pole E6, and a track E7 are larger than the ball B, the ball B cannot be combined with any of them.

The object E which cannot be combined with the ball B affects the ball B as an obstacle. For example, when the ball B comes into collision with the object E which affects the ball B as the obstacle, the object E which is previously combined with the ball B, is separated from the ball B by the collision, or the ball B is deformed by the force of the collision and the rotation of the ball B is affected. Accordingly, the player ascertains the object E which will be not able to be combined with the ball B, controls the ball B so as to dodge the object E well, and enlarges the ball B.

FIGS. 3A, 3B and 3C are views for explaining examples of methods for operating the ball B. In FIGS. 3A to 3C, a key or a button which is pushed is shown in black. The cross key 1206 and the button group 1207 as two systems of direction input means provided for the game controller 1202 or 1204, correspond to means for inputting rotations of a left hemisphere and a right hemisphere, respectively. Therefore, the direction of rolling the ball B is determined according to the difference between the rotation of the left hemisphere and the rotation of the right hemisphere which are inputted through the cross key 1206 and the button group 1207. That is, the direction of rolling the ball B is determined according to the difference between the inputted operation signal of the right hemisphere and the inputted operation signal of the left hemisphere.

For example, in case of moving the ball B on the straight, as shown in FIG. 3A, the player pushes the upward direction of the cross key 1206 and the button 1207a the approximately same. In case of curving the ball B, the player discriminates between the inputted quantity of the cross key 1206 and the inputted quantity of the button group 1207. As shown in FIG. 3B, when the player pushes only the upward direction of the cross key 1206, because the rotation of the left hemisphere is more than the rotation of the right hemisphere, the direction of the ball B is changed to the rightward, according to the difference between the torques. Further, as shown in FIG. 3C, when the player pushes the upward direction of the cross key 1206 and the button 1207c, the ball B is rotated around the center, so that the direction of the ball B is changed without changing the central position.

Figure 4:
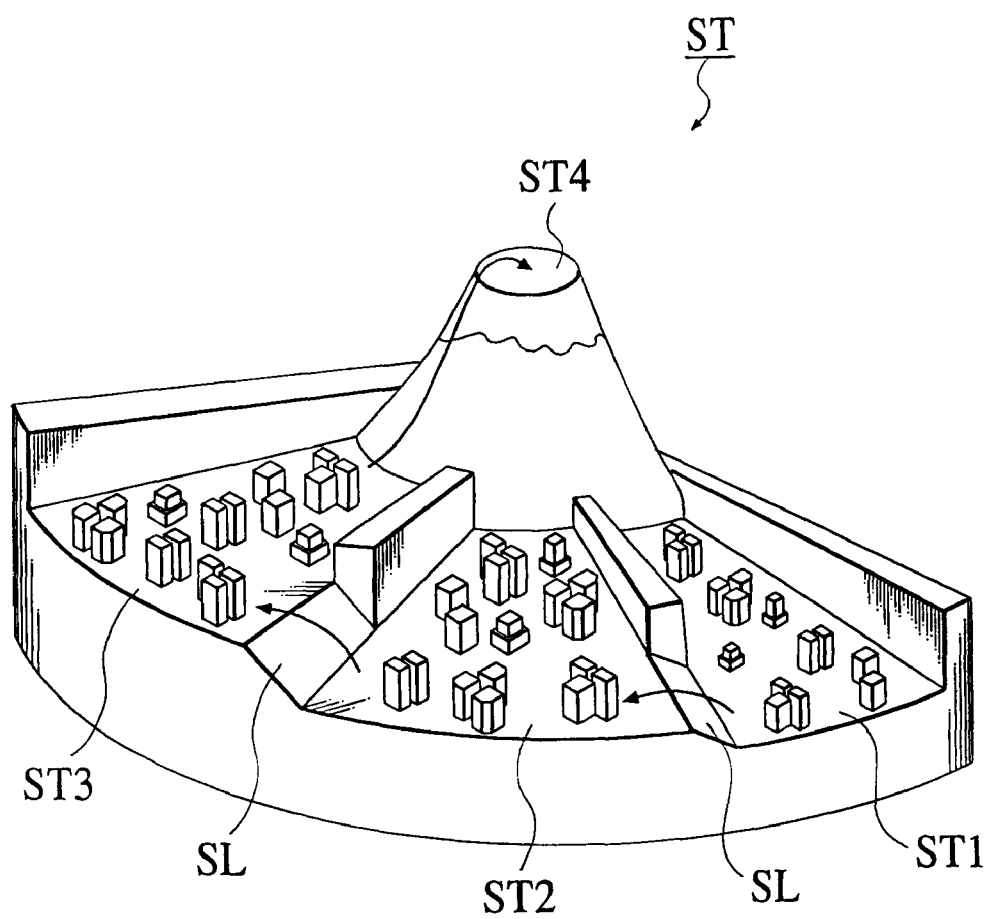
FIG. 4 is a conceptual view showing an example of a structure of a game stage.

FIG. 4 is a conceptual view showing an example of a structure of the game stage. According to the first embodiment, the game stage consists of stages ST1 to ST3. The size of the object E provided for the stage becomes large as the stage progresses. For example, the object E of the size such as an empty can, a baseball ball, a tennis racket, a TV or the like, is provided for the stage ST1. Further, the object E of the size such as a bench, a refrigerator, a mailbox, a bicycle, a tax or the like, is provided for the stage ST2. Furthermore, the object E of the size such as a track, a bus, a train, a house or the like, is provided for the stage ST3. More specifically, the maximum value of the size of the object E is determined for every stage. Therefore, smaller various objects E than the maximum value are provided for every stage.

The stages STs are divided with a slope SL. Therefore, when the ball B goes over the slope SL, the ball B can progress to the next stage. That is, the maximum arrival speed or the acceleration of the ball B becomes high, according to the size of the ball B. Therefore, when the ball B is combined with the object E and enlarged efficiently, the ball B goes over the slop SL and progresses to the next stage by the force.

The ball B is firstly combined with the object E of the size such as an empty can or the like. With the ball B becomes large, the ball B is combined with the object E of the size such as a bicycle, a mailbox, a bus or the like. Finally, the ball B is combined with the object E of the size such as a house, a utility pole or the like, destroys the town, and becomes large. Lastly, when the player stuffs a crater ST4 of MT. Fuji, with the enlarged ball B, and prevents an eruption, the player clears the game.

The player can enjoy making the character dodge the obstacle and run through the stage, like the conventional action adventure game. Further, the player can take enjoyment which the player cannot find conventionally, that is, the player can enjoy making full use of the operation technique of rolling the ball according to the difference between the right and left rotations, and feeling the ball destroying the object, which happens in the unusual state and which is filled with jokes.

[Explanation of Functional Block]

Next, the functional block realizable of the first embodiment, will be explained, as follows.

Figure 5A:
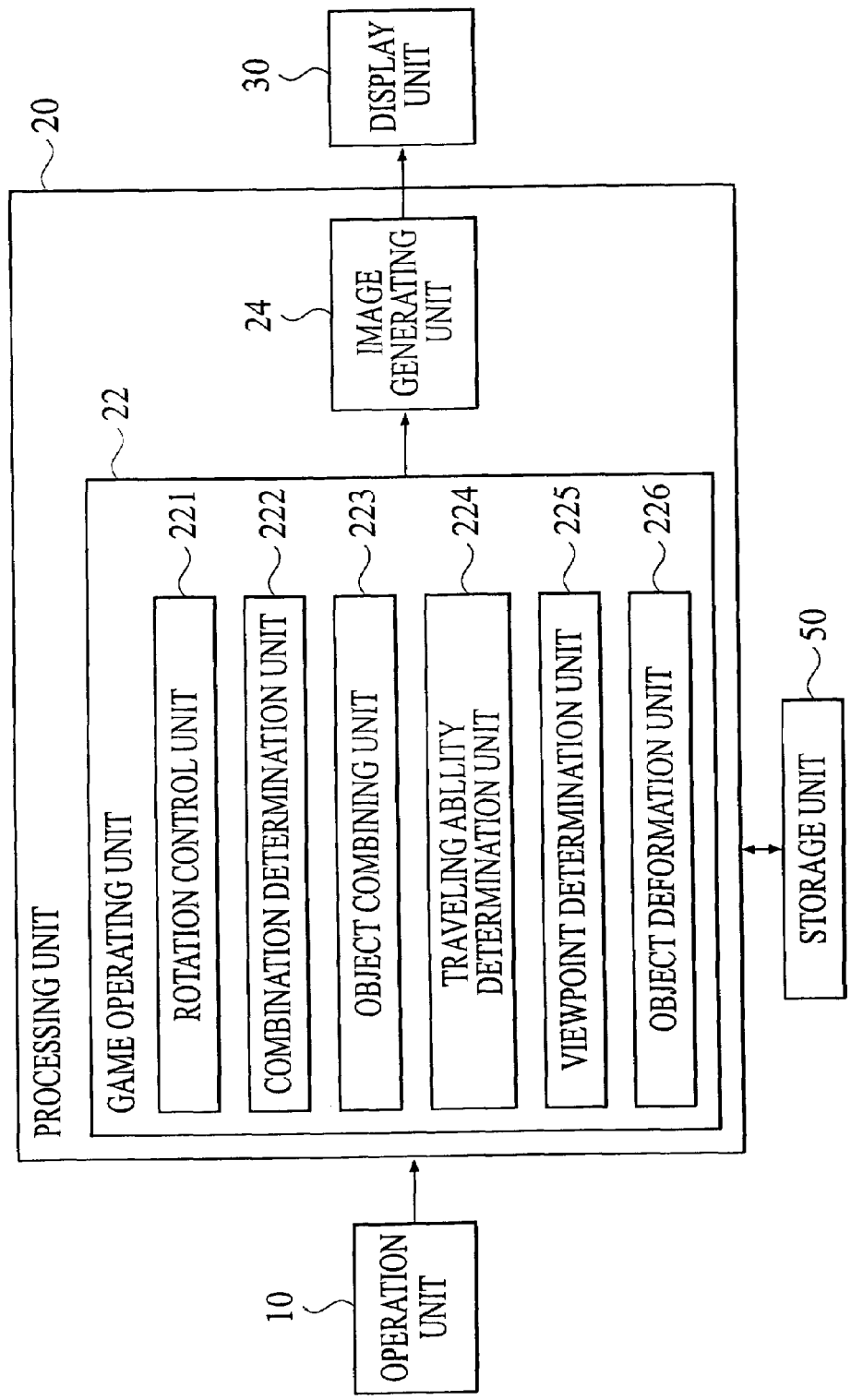
FIG. 5A is a block diagram showing an example of a functional structure.
Figure 5B:
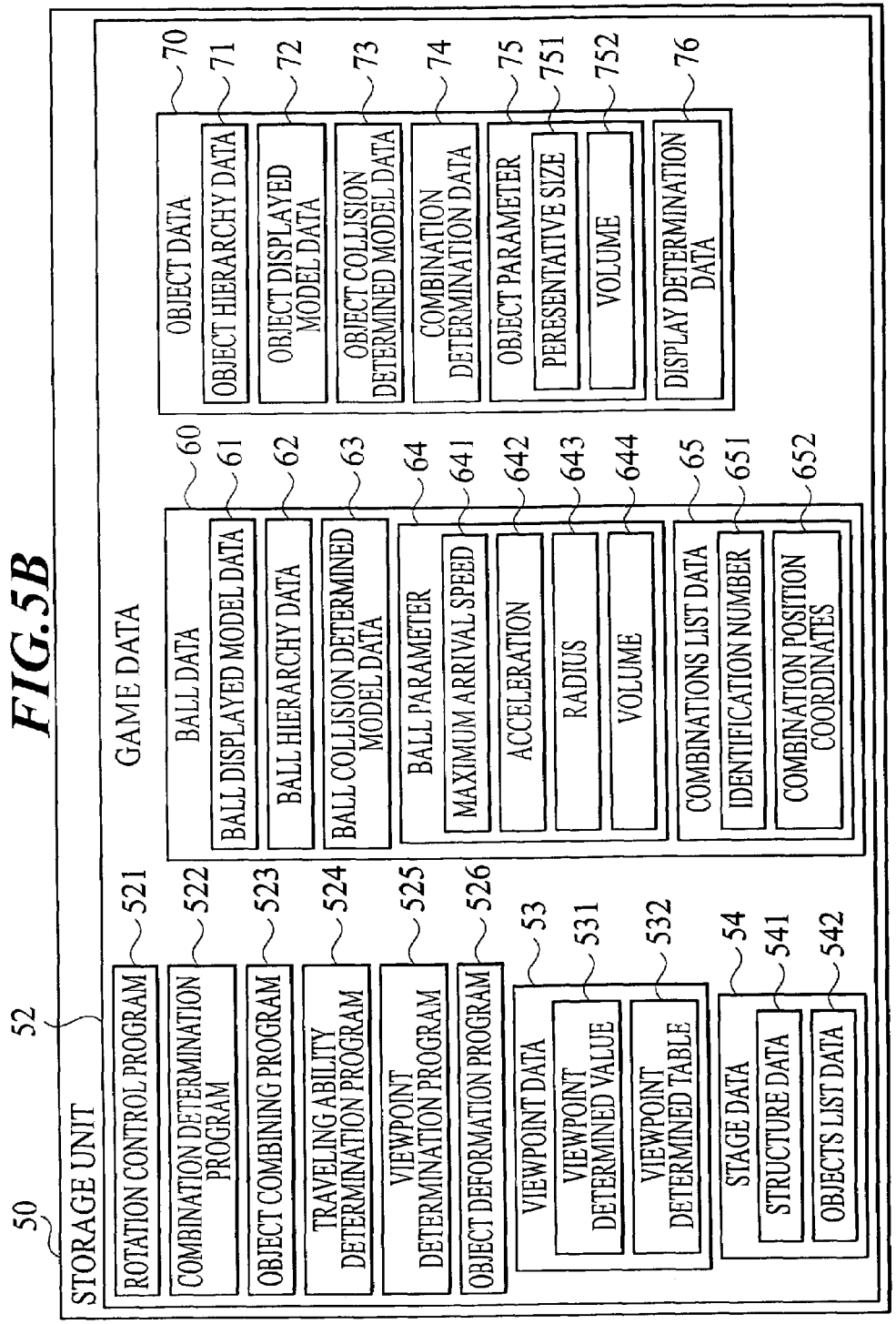
FIG. 5B is a block diagram showing an example of a storage unit 50 of the functional structure.

FIGS. 5A and 5B are block diagrams showing examples of functional structures according to the first embodiment. As shown in FIGS. 5A and 5B, the functional block composing the first embodiment, comprises an operation unit 10 through which the player inputs the operation, a processing unit 20 for processing the operation for controlling the apparatus or the game, a display unit 30 for displaying the game screen thereon, and a storage unit 50 for storing the program, data or the like therein.

The operation unit 10 corresponds to the game controller 1202 or 1204 shown in FIG. 1. The player inputs the operation through the operation unit 10. The operation signal outputted from the operation unit 10 is transmitted to the processing unit 20.

The processing unit 20 performs various operating processing such as a processing for controlling the whole game apparatus, a processing for instructing each functional block of the game apparatus, a processing for operating the game or the like. The function of the processing unit 20 can be realized by a hardware such as a CPU (the CISC type, the RISC type), the DSP, the ASIC (the gate array or the like) or the like, a predetermined program, data or the like. The processing unit 20 comprises a game operating unit 22 for performing the processing for operating the game, and an image generating unit 240 for generating image data based on various types data obtained by the processing performed by the game operating unit 22.

The game operating unit 22 performs various game processing on the basis of the operation signal inputted through the operation unit 10, programs, data or the like read out of the storage unit 50. The game processing includes, for example, a processing for calculating coordinates of the position, the speed or the like, of the object as the object moves, a processing for determining the collision of the object, a processing for providing the object in the object space, a processing for selecting mapping information of the object, a processing for obtaining the result (score) of the game, and so on.

Further, the game operating unit 22 comprises a rotation control unit 221, a combination determination unit 222, an object combining unit 223, a traveling ability determination unit 224, a viewpoint determination unit 225 and an object deformation unit 226.

The rotation control unit 221 determines the direction in which the ball B moves, the quantity by which the ball B moves, and the rotation of the ball B. More specifically, for example, the cross key 1206 shown in FIG. 1, is related to the input of the left hemisphere rotation of the ball B, and the button group 1207 shown in FIG. 1, is related to the input of the right hemisphere rotation of the ball B. Therefore, the rotation control unit 221 compounds the speeds of the right and left hemispheres, determines the speed of the ball B, and calculates the quantity by which the ball B moves, for every frame. When determining the moving direction and the moving quantity, the rotation control unit 221 determines the quantity by which the ball B rotates, so that the moving direction and the moving quantity are caused by the rotation.

The combination determination unit 222 compares the parameter of the ball B with the parameter of the size of the object E, and determines whether the object E can be combined with the ball B or not, for every object E. More specifically, for example, the combination determination unit 222 searches the object E provided within the predetermined distance from the ball B, and considers the object E as the object of the determination. Then, when the combination determination unit 222 determines that the size of the object E is smaller than 20% of the radius of the ball B, the object E can be combined with the ball B. In case the object E is a hierarchical model consisting of a plurality of nodes (elements), the combination determination unit 222 performs the processing for every note.

The object combining unit 223 calculates the contact position at which the object E and the ball B are contacted with each other, on the basis of displayed models of object E and the ball B, and combines the object E with the ball B at the contact position, in case it has been determined that the ball B comes into collision with the object E, and the object E is determined to be combined with the ball B. By contraries, the object combining unit 223 separates the object E which has been combined with the ball B, from the ball B, in case it has been determined that although the ball B comes into collision with the object E, the object E cannot be combined with the ball B because the size of the object E.

More specifically, the object combining unit 223 can combine the object E with the ball B, and separate the object E from the ball B, by defining the hierarchical relation between the model of the ball B and the model of the object E. Therefore, when the ball B (operated object) comes into collision with or is combined with the object E, the hierarchical relation is renewed. Accordingly, the ball B with which the object E is combined, is processed as a new operated object.

Further, the object combining unit 223 enlarges/reduces the collision determined model of the ball B, according as the object E is combined with/separated from the ball B. For example, in case the object E is combined with the ball B, the object combining unit 223 enlarges the collision determined model of the ball B to the same size as the total volume of the volume of the ball B and the volume of the object E. By contraries, in case the object E which has been combined with the ball B is separated from the ball B, the object combining unit 223 reduces the collision determined model of the ball B by the volume of the object E separated from the ball B.

The traveling ability determination unit 224 changes the traveling ability parameter of the ball B according to the size of the ball B. The traveling ability parameter may include, for example, not only the maximum arrival speed, the acceleration and so on, but also the inertia and so on, as the occasion may demand. According to the first embodiment, the quantity of change in the parameter, is determined so as to keep the constant relation between the quantity of operating the ball B with the game controller 1202 or 1204 and the quantity of moving the ball B on the game screen. As a result, it is possible to realize the game the player can always stably operate and play without feeling stress, regardless of the size or the weight of the ball B.

The viewpoint determination unit 225 changes the condition of the viewpoint according to the size of the ball B, and determines whether the extremely small object displayed on the game screen, is displayed or not, according to the condition of the viewpoint. According to the first embodiment, the viewpoint determination unit 225 changes the condition of the viewpoint to the predetermined condition, gradually, even when the size of the ball B gets to the predetermined size. Then, the viewpoint determination unit 225 determines the condition (the angle, the view angle or the like) of the viewpoint, so that the rate of the ball B in the game screen just after changing the condition of the viewpoint is approximately the same as one before changing the condition of the viewpoint.

Figure 13A:
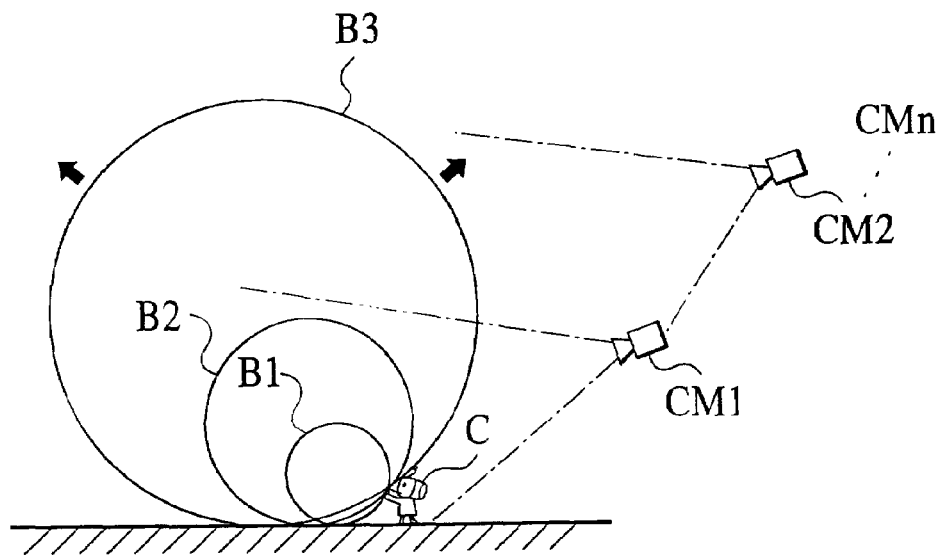
FIGS. 13A, 13B, 13C, 13D and 13E are conceptual views for explaining a concept of changing a viewpoint.

For example, FIGS. 13A to 13E are views for explaining the concept of changing the viewpoint according to the first embodiment. As shown in FIG. 13A, according to the first embodiment, the viewpoint (virtual camera) CM is provided behind the character C which pushes the ball B. Further, the position at which the viewpoint is provided is changed, and the viewpoint is changed (CM1-CM2- . . . ), according as the size of the ball B is changed (B1-B2-B3- . . . ).

Figure 13B:
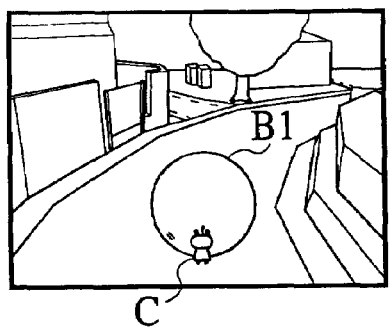
Figure 13D:
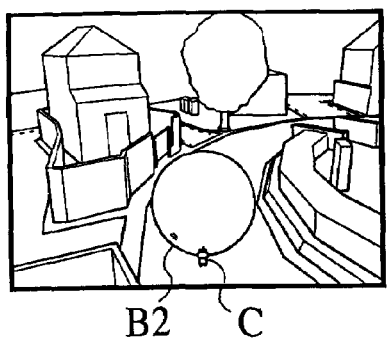
Figure 13C:
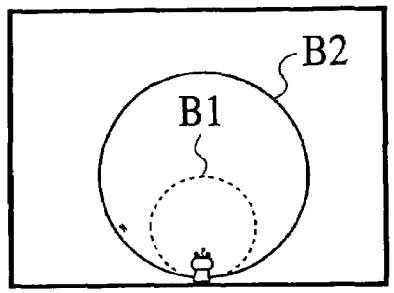
Figure 13E:
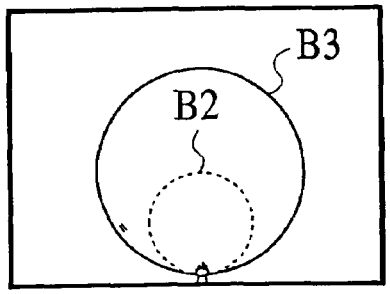

More specifically, for example, FIGS. 13B, 13C, 13D and 13E show examples of the game screens. FIGS. 13B and 13C are game screens based on the viewpoint CM1. The ball B becomes large from the ball B1 to the ball B2, as the game progresses. Therefore, as shown in FIG. C, because the rate of the ball B in the game screen increases, it becomes hard to see the forward. Accordingly, the viewpoint is changed from the viewpoint CM1 to the viewpoint CM2. FIGS. 13D and 13E are game screens based on the viewpoint CM2. Herein, the ball B is displayed on the screen shown in FIG. 13D just after the viewpoint is changed from the viewpoint CM1 to the viewpoint CM2, so that the size of the ball B displayed on the screen shown in FIG. 13D, is approximately the same as the size of the ball B displayed on the screen shown in FIG. 13B.

The object deformation unit 226 changes the displayed model of the ball B according to the relative momentum "mv" of the ball B and the object E, in case the ball B comes into collision with the object E (obstacle) which cannot be combined with the ball B.

More specifically, for example, the object deformation unit 226 deforms the displayed model of the ball B according to the known method such as the FFD (Free Form Deformation) or the like. Because the object E which has been combined with the ball B and the displayed model of the ball B have the hierarchal relation, and the object E is deformed as the ball B is deformed, the whole ball B is deformed. Although the ball B is deformed plastically according to the first embodiment, the ball B may be deformed elastically according to the game story or the condition of the ball B. Further, the quantity of the deformation of the ball B may be determined according to the characteristic of the game, as the occasion may demand.

The image generating unit 24 consists of a hardware such as a CPU, the DSP, an image generation exclusive IC, a memory or the like. The image generating unit 24 generates image signals on the basis of the instruction signal, various types coordinate data or the like, outputted from the game operating unit 22. Further, for example, the image generating unit 24 performs a composition processing for changing the a value of the object E, and semitransparently displaying the object, or the like.

The display unit 30 is a device for displaying the game screen on the basis of the image signals generated by the image generating unit 24, thereon. The display unit 30 corresponds to the display 1220 shown in FIG. 1. The display unit 30 can be realized by a hardware such as a CRT, a LCD, an ELD, a PDP, a HMD or the like.

The storage unit 50 stores a program, data or the like, for executing the control of the whole apparatus. For example, the storage unit 50 can be realized by a hardware such as a CD-ROM, a game cassette, an IC card, a MD, the FD (registered mark), a DVD, an IC memory, a hard disc or the like. The storage unit 50 stores game data 52 including a program for executing various processing for the game, and data such as determined values required to execute the program.

As the program, the game data 52 includes a rotation control program 521 for making the rotation control unit 221 function, a combination determination program 522 for making the combination determination unit 222 function, an object combining program 523 for making the object combining unit 223 function, a traveling ability determination program 524 for making the traveling ability determination unit 224 function, a viewpoint determination program 525 for making the viewpoint determination unit 225 function, and an object deformation program 526 for making the object deformation unit 226 function.

Further, as the data, the game data 52 includes viewpoint data 53, stage data 54, ball data 60 and object data 70 for storing data required to determine whether the ball B and the object E are displayed or not, or whether the ball B comes into collision with the object E.

Figures 6, 7:
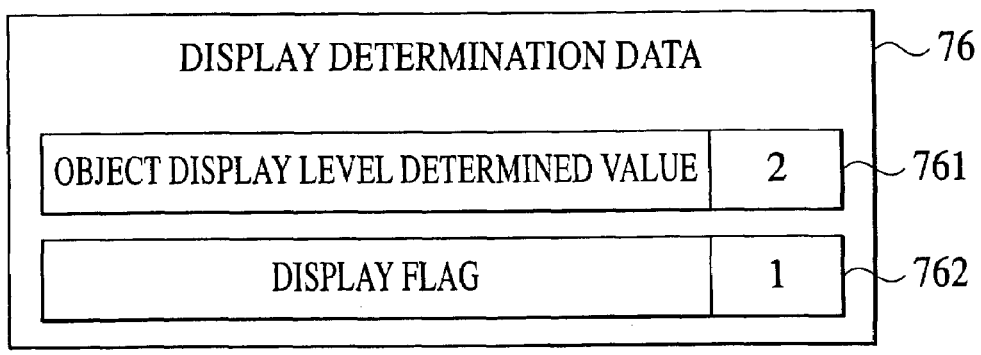
FIG. 6 is a table showing an example of a data structure of a viewpoint determined table.
FIG. 7 is a table showing an example of a data structure of a display determination data.

The viewpoint data 53 stores a viewpoint determined value 531 for storing determined values such as a position, a view angle or the like, of the present viewpoint, and a viewpoint determined table 532. The viewpoint determined table 532, as shown in FIG. 6, stores a ball size range 532-1 of the ball B, a proper determined value 532-2 storing determined values such as a position, a view angle or the like, of the viewpoint related to the ball size range 532-1, and a display level 532-3.

The stage data 54 stores, for example, structure data 541, objects list data 542 of the objects E provided in each stage, a clear condition or the like.

The structure data 541 stores data for providing the space of the stage, for example, data such as a position or an inclined angle of the slop SL.

The objects list data 542 registers the object E which is not larger than the size which is previously determined for every stage. More specifically, the object list data 542 registers, for example, the object E (for example, the objects E1 to E3 shown in FIG. 2) which is determined to be the size so as to be combined with the ball B of the size required to clear the stage, and the object E (for example, the objects E4 to E12 shown in FIG. 2) which is determined to be the size so as to function as the obstacle in the stage. Because the object E is provided in the object space, on the basis of the objects list data 542, it is possible to adjust the size of the object E which can be combined with the ball B, for every stage.

The clear condition is that the ball B goes over the slop SL at a predetermined slope, the slope SL dividing the stages STS, as shown in FIG. 4, according to the first embodiment. However, for example, the clear condition may be the number of specific items (for example, 500 empty cans) which are combined with the ball B, of items which are provided in each stage ST. Therefore, the clear condition may be determined as the occasion may demand.

The ball data 60 includes ball displayed model data 61, ball hierarchy data 62, ball collision determined model data 63, a ball parameter 64, and combinations list data 65.

The ball displayed model data 61 stores modeling data of the original model as an initial state any object E is not combined with the ball B.

The ball hierarchy data 62 stores data of the hierarchical structure consisting of the original model of the ball B as the parent node (element) and the object E which is combined with the ball B as the child node (element). According to the first embodiment, the ball hierarchy data 62 stores, for example, the identification number of the object E, the coordinates of the position at which the object E is combined with the ball B, and the posture angle data of the object E. However, the ball hierarchy data 62 may store contents of data selected as the occasion may demand.

The ball collision determined model data 63 stores modeling data of the ball collision determined model of the ball B. According to the embodiment, the collision determined model is defined as a so-called bounding volume.

The ball parameter 64 stores a state and various determined data of the present ball B. More specifically, for example, the ball parameter 64 includes a speed, an acceleration, position coordinates, a rotation angle, a minimum circular radius, a maximum arrival speed 641, an acceleration 642, a radius 643 and a volume 644. The contents of data stored in the ball parameter 64 is not limited to the above-described data. The contents of data stored in the ball parameter 64 may be determined as the occasion may demand.

The combinations list data 65 stores the identification number 651 and the combination position coordinates 652 of the object E, in the order of the combination with the ball B.

The object data 70 store data on the display or the collision determination of each of all objects other than the ball B, provided in the game space, for every object E. The object data 70 further stores data on the displayed form or the composition such as the texture, the value of the object E, or the like.

Further, the object data 70 include object hierarchy data 71, object displayed model data 72, object collision determined model data 73, combination determination data 74, an object parameter 75, and display determination data 76.

Figure 14A:
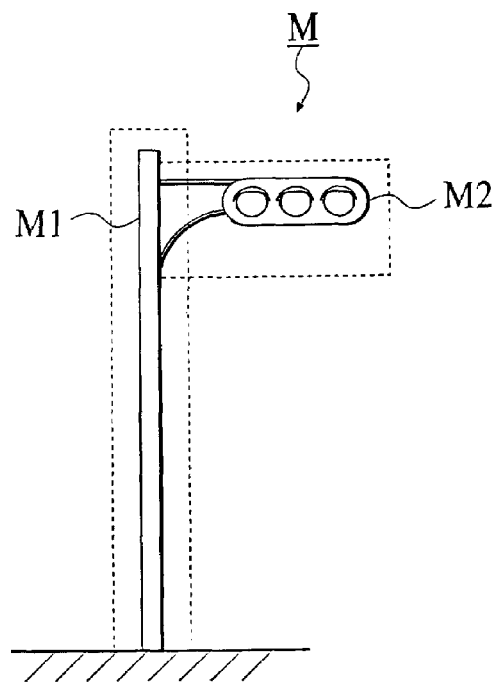
FIGS. 14A, 14B and 14C are views showing examples of concepts concerning a hierarchical model of an object.
Figure 14B:
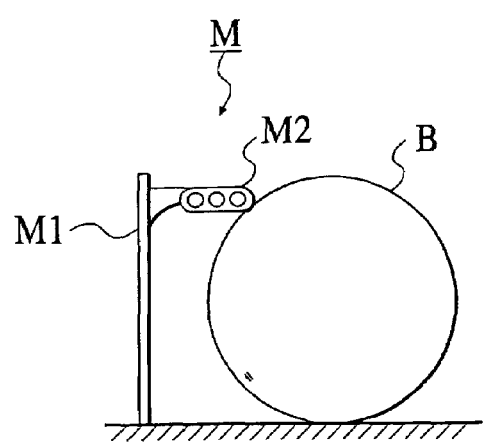
Figure 14C:
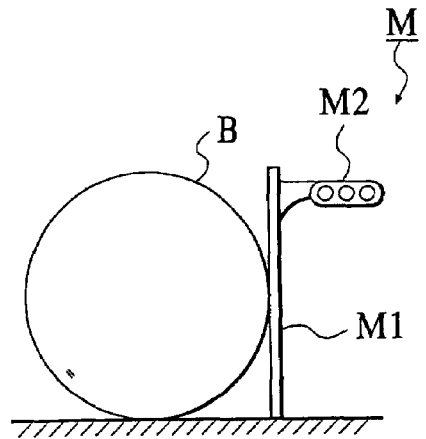

The object hierarchy data 71 store hierarchy data of the model of the object E. For example, the object hierarchy data 71 stores a signal M consisting a signal pole M1 as the parent node, and a signal head M2 as the child node, as the hierarchical model, as shown in FIGS. 14A to 14C (a broken line shows a bounding volume of each node, in FIG. 14A).

The object displayed model data 72 store modeling data of the displayed model of each of nodes composing the object E.

The object collision determined model data 73 store modeling data of the collision determined model of each of nodes composing the object E. According to the first embodiment, the collision determined model is a so-called bounding volume (for example, shown in the broken line in FIG. 14A). However, the collision determined model may be determined as the occasion may demand.

The combination determination data 74 store data showing whether the object E can be combined with the ball B or not, for example, "1" showing that the object E can be combined with the ball B or "0" showing that the object E cannot be combined with the ball B. The combination determination data 74 is determined when the combination determination unit 222 compares the size of the ball B with the size of the node.

The object parameter 75 stores data on the size of the node. The object parameter 75 includes, for example, data on a speed, an acceleration, position coordinates, a rotation angle, a maximum arrival speed, a representative size 751, a volume 752 or the like, like the ball parameter 64. Further, the object parameter 75 may include data on a weight, a temperature, an attribute or the like, as the occasion may demand.

The display determination data 76 store, for example, an object display level determined value 761 related to the display level 532-3 of the viewpoint data 53, and a display flag 762 for specifying whether the object E is displayed and determined to come into collision with the ball, or not, as shown in FIG. 7.

As shown in FIG. 7, the object display level determined value 761 shows that the object is displayed while the display level is not larger than the determined value. Therefore, even when the viewpoint is changed, the object display level determined value 761 is compared with the display level 532-3 of the viewpoint data 53. In case shown in FIG. 7, because it is determined that the object is not displayed at the viewpoint having the display level 532-3 which is equal to or larger than "3", "0" is stored in the display flag 762.

Therefore, for example, in case the range displayed on the game screen is approximately the field of vision of a human, the object E of the size of the empty can is determined to be displayed. However, in case the range displayed on the game screen is extended and approximately a bird's eye view, the object E of the size of the empty can is determined to be not displayed. Accordingly, it is possible to keep the game screen which can be seen easily, and to reduce the processing load.

[Explanation of Flow]

Next, the detailed flow of the processing according to the first embodiment, will be explained with reference to FIGS. 8A to 11. Because a processing for determining the collision, a processing for calculating coordinates of the position at which the models are contacted with each other, a movement operating processing for determining the position, the speed, the acceleration, and the rotation of the object, or the like has been known, it is omitted to explain the above-described processing.

Figure 8A:
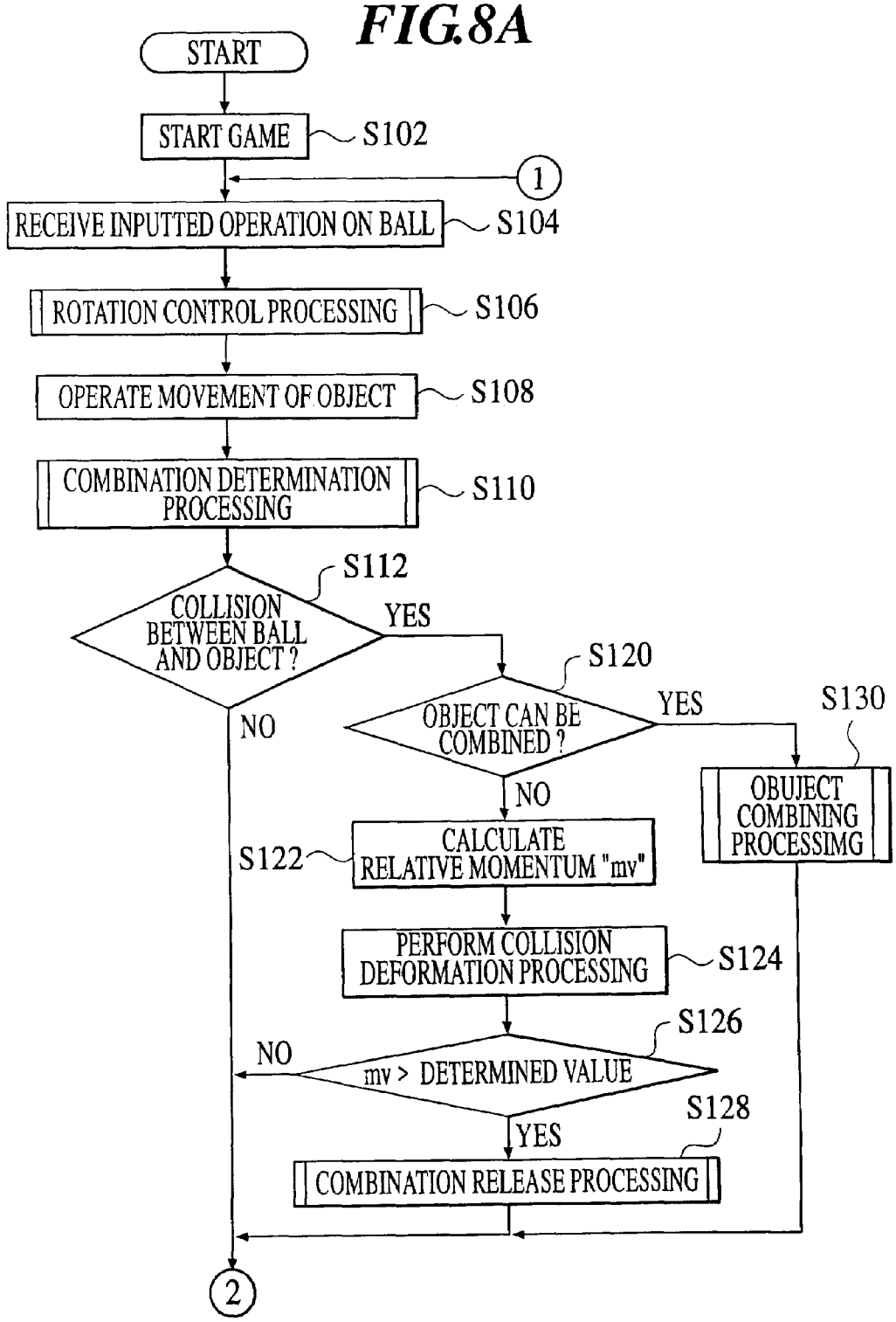
FIGS. 8A and 8B are flow charts for explaining a flow of a game processing.
Figure 8B:
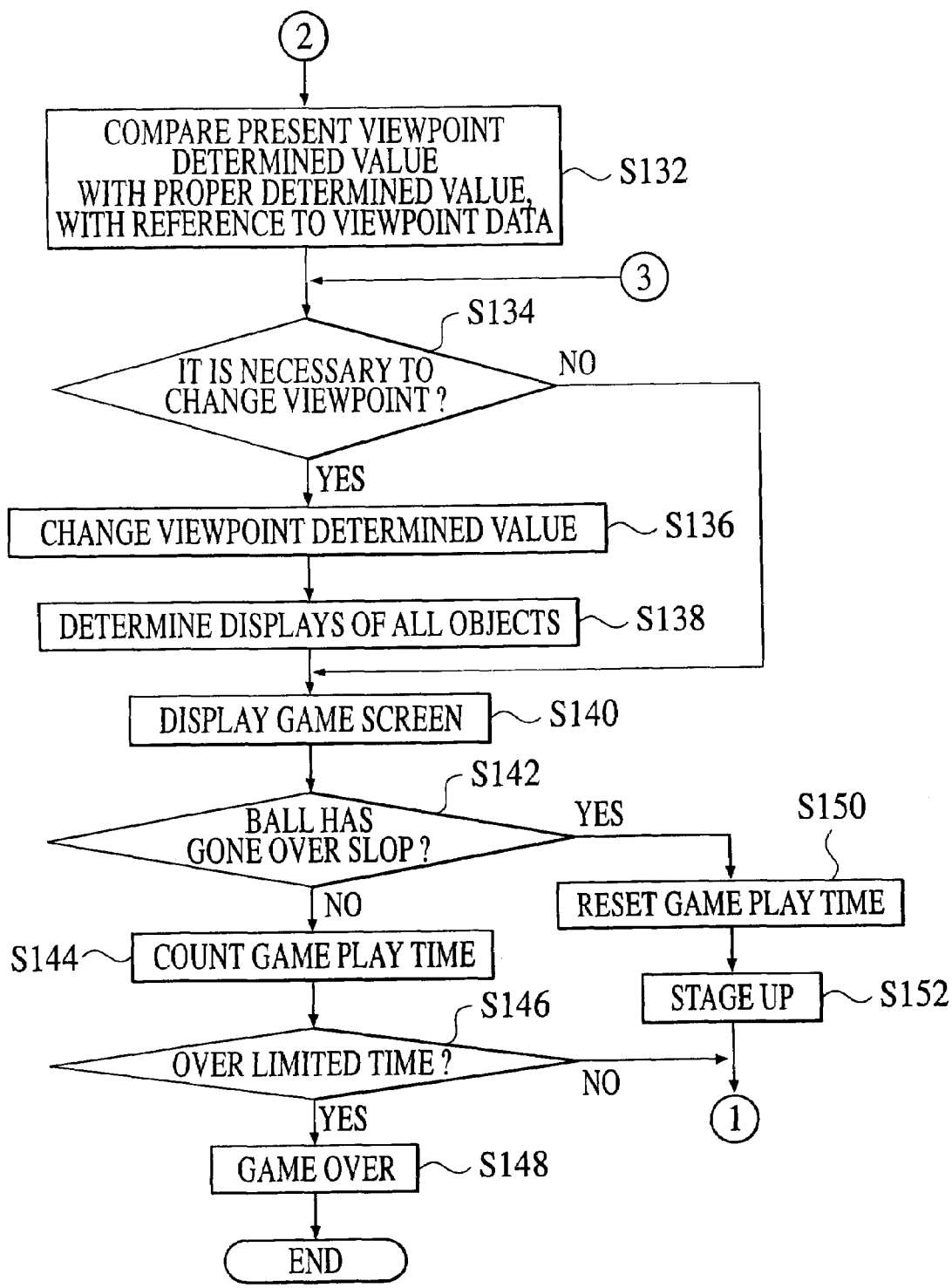

FIGS. 8A and 8B are flow charts for explaining the flow of the game processing.

As shown in FIG. 8A, firstly, the game operating unit 22 determines the size or the position of the ball B, the viewpoint, the stage, in default, and starts the game (Step S102).

When the game operating unit 22 starts the game, and receives the operation for moving the ball, inputted through the operation unit 10 (Step S104), the rotation control unit 221 executes the rotation control processing, and calculates the rotation of the ball B on the basis of the operation signal inputted through the operation unit 10 (Step S106).

[Rotation Control Processing]

Figure 9:
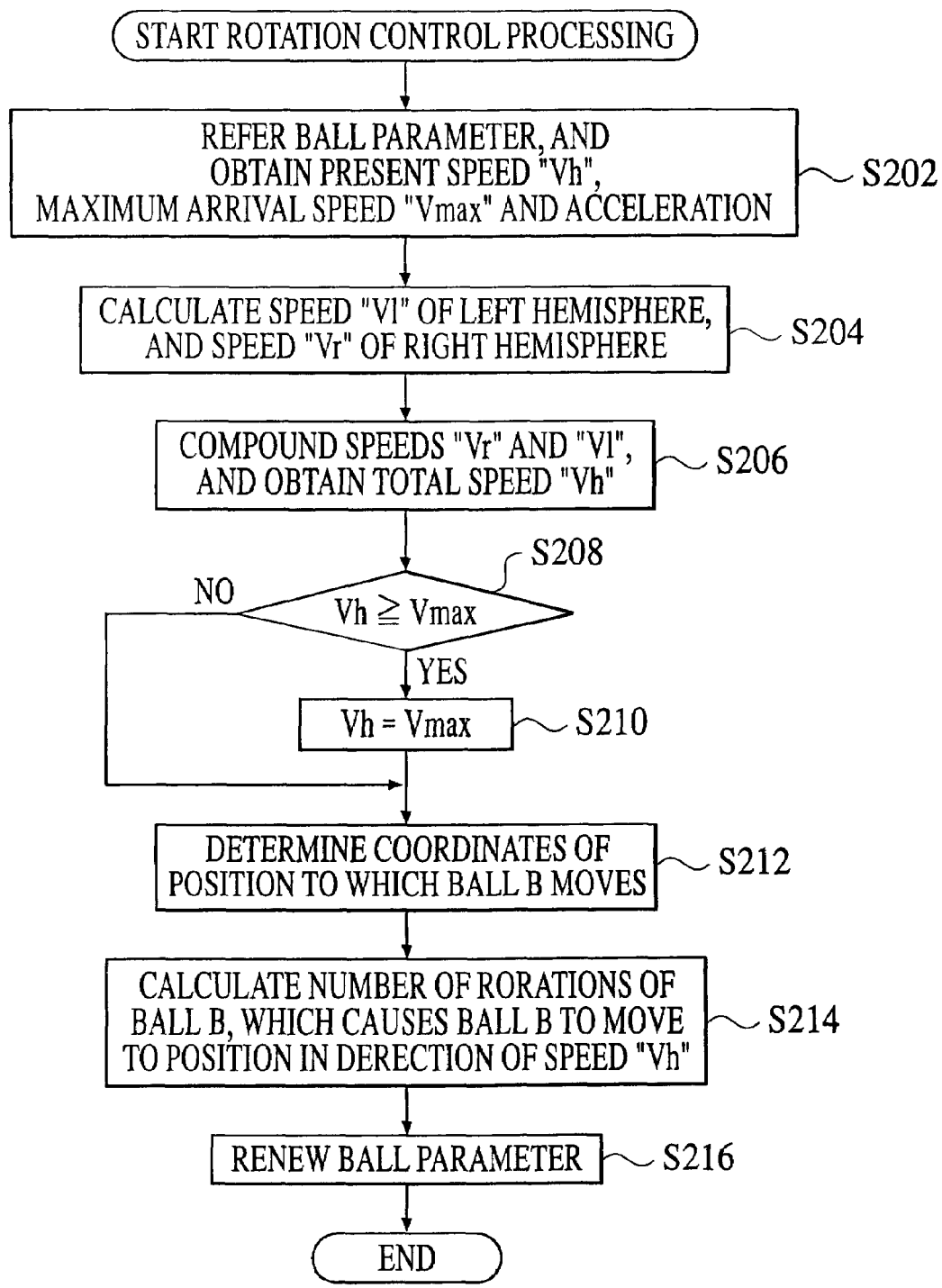
FIG. 9 is a flow chart for explaining a flow of a rotation control processing.

FIG. 9 is a flow chart for explaining the flow of the rotation control processing. According to the rotation control processing, firstly, the rotation control unit 221 refers the ball parameter 64, and obtains data on the present speed "Vh", the position, the maximum arrival speed "Vmax", the acceleration or the like (Step S202).

Then, the rotation control unit 221 calculates the speed "Vl" of the left hemisphere of the ball B on the basis of the input through the cross key 1206, and the speed "Vr" of the right hemisphere of the ball B on the basis of the input through the button group 1207 (Step S204). When calculating the speeds "Vl" and "Vr" of the left and right hemispheres, the rotation control unit 221 compounds the speeds "Vr" and "Vl", and obtains the total speed "Vh" of the ball B (Step S206).

When the rotation control unit 221 determines that the speed "Vh" is equal to or higher than the maximum arrival speed 641 "Vmax" (Vh≧Vmax) (Step S208; YES), the rotation control unit 221 determines the speed "Vh" to the maximum arrival speed "Vmax" (Vh=Vmax) (Step S210).

When obtaining the speed "Vh", the rotation control unit 221 determines coordinates of the position to which the ball B moves (Step S212). Then, the rotation control unit 221 calculates the number of rotations of the ball B, which causes the ball B to move to the position in the direction of the speed "Vh", that is, the rotation angle (Step S214). Thereafter, when the rotation control unit 221 renews the ball parameter 64

(Step S216), and ends the rotation control processing, the game processing comes back to the flow shown in FIG. 8A.

Coming back to the flow shown in FIG. 8A, the game operating unit 22 operates the movement of the object E (for example, a car, a human, an animal) other than the ball B, which moves by itself (Step S108).

When the game operating unit 22 determines the positions of the ball B and the object E, the combination determination unit 222 executes the combination determination processing, and determines whether the object E included within the predetermined range from the ball B, can be combined with the ball B or not (Step S110).

[Combination Determination Processing]

Figure 10:
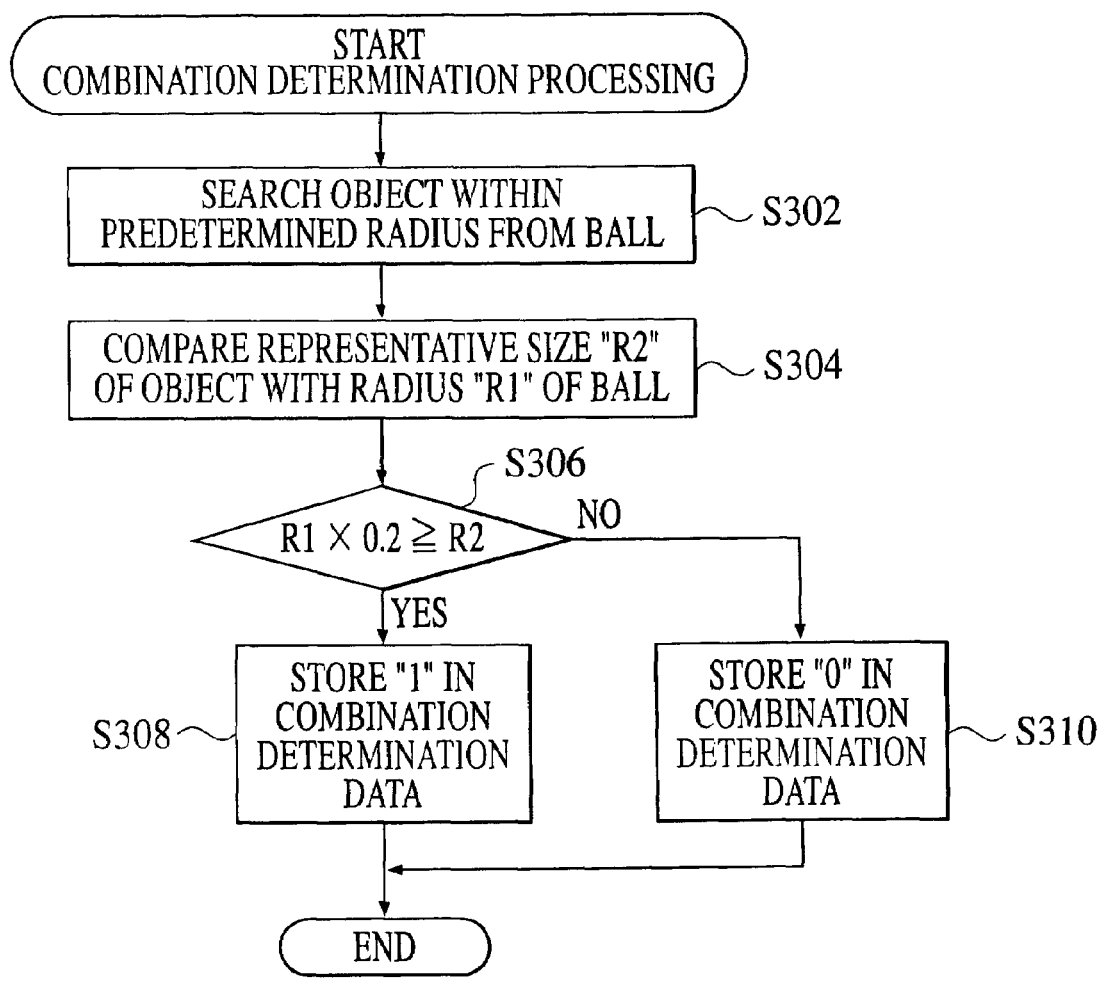
FIG. 10 is a flow chart for explaining a flow of a combination determination processing.

FIG. 10 is a flow chart for explaining the flow of the combination determination processing.

Figure 15:
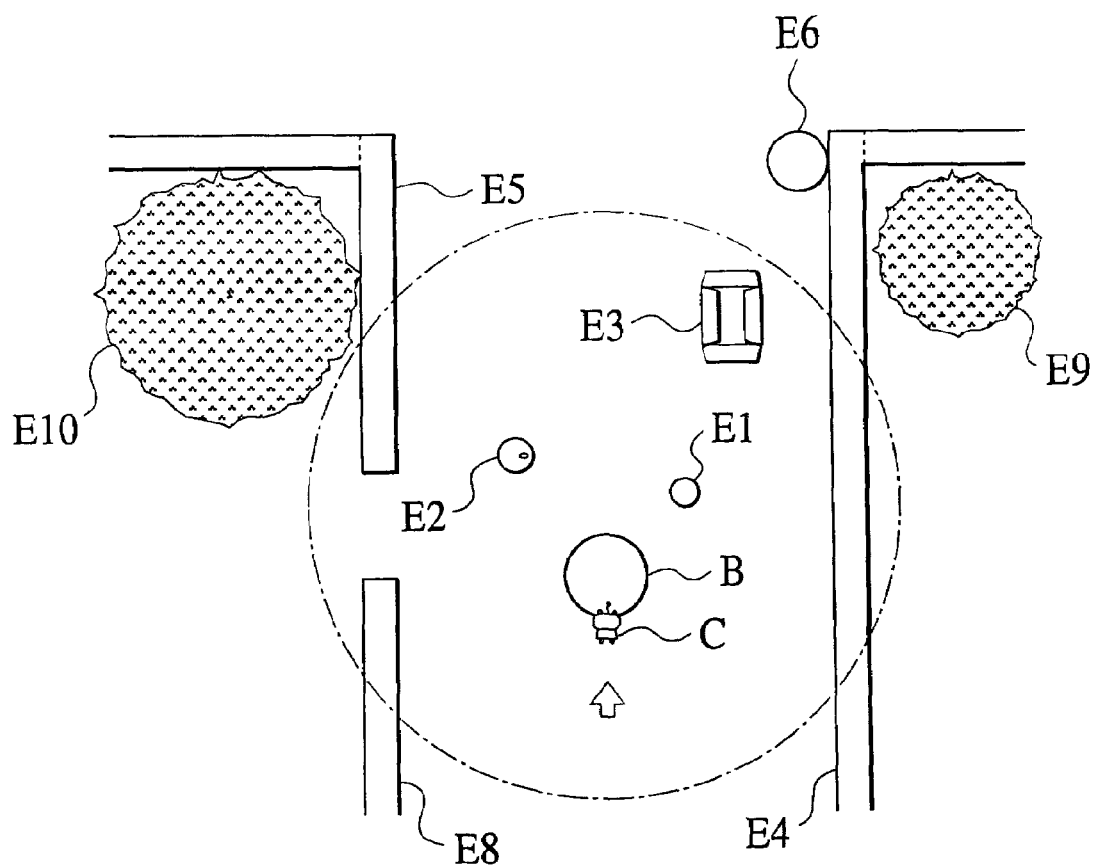
FIG. 15 is a view showing a state the ball moving on a road surrounded with walls, is viewed from a right above position.

As shown in FIG. 10, firstly, the combination determination unit 222 searches the object E which is within the predetermined radius from the ball B (Step S302). For example, FIG. 15 is a view showing a state the ball B moving on the road surrounded with the walls E4, E5 and E8, is viewed from the right above position. In case shown in FIG. 15, the objects E1 to E3 are objects of the combination determination.

Then, the combination determination unit 222 compares the object parameter 75 of the searched out object E with the ball parameter 64, that is, compares the representative size 751 (R2) of the object E with the radius 643 (R1) of the ball B, and determines the size relation between the object E and the ball B (Step S304).

When the combination determination unit 222 determines that the representative size 751 (R2) of the object E is equal to or smaller than 20% of the radius 643 (R1) (R1×0.2≧R2) (Step S306; YES), the combination determination unit 222 determines that the object E can be combined with the ball B, and stores "1" in the combination determination data 74 of the object E (Step S308). On the other hand, when the combination determination unit 222 determines that the representative size 751 (R2) of the object E is not equal to or smaller than 20% of the radius 643 (R1) (R1×0.2<R2) (Step S306; NO), the combination determination unit 222 determines that the object E is too large to be combined with the ball B, and stores "0" in the combination determination data 74 of the object E (Step S310). Thereafter, when the combination determination unit 222 has stored the result of the determination in the combination determination data, and ends the combination determination processing, the game processing comes back to the flow shown in FIG. 8A.

Coming back to the flow shown in FIG. 8A, the game operating unit 22 executes the determination of the collision between the ball B and the object E (Step S112). When determining that the ball B comes into collision with the object E (Step S112; YES), the game operating unit 22 determines whether the object E can be combined with the ball B or not, with reference to the combination determination data 74 of the object E (Step S120).

When the game operating unit 22 determines that the object E can be combined with the ball B (Step S120; YES), the object combining unit 223 executes the object combining processing (Step S130).

[Object Combining Processing]

Figure 11:
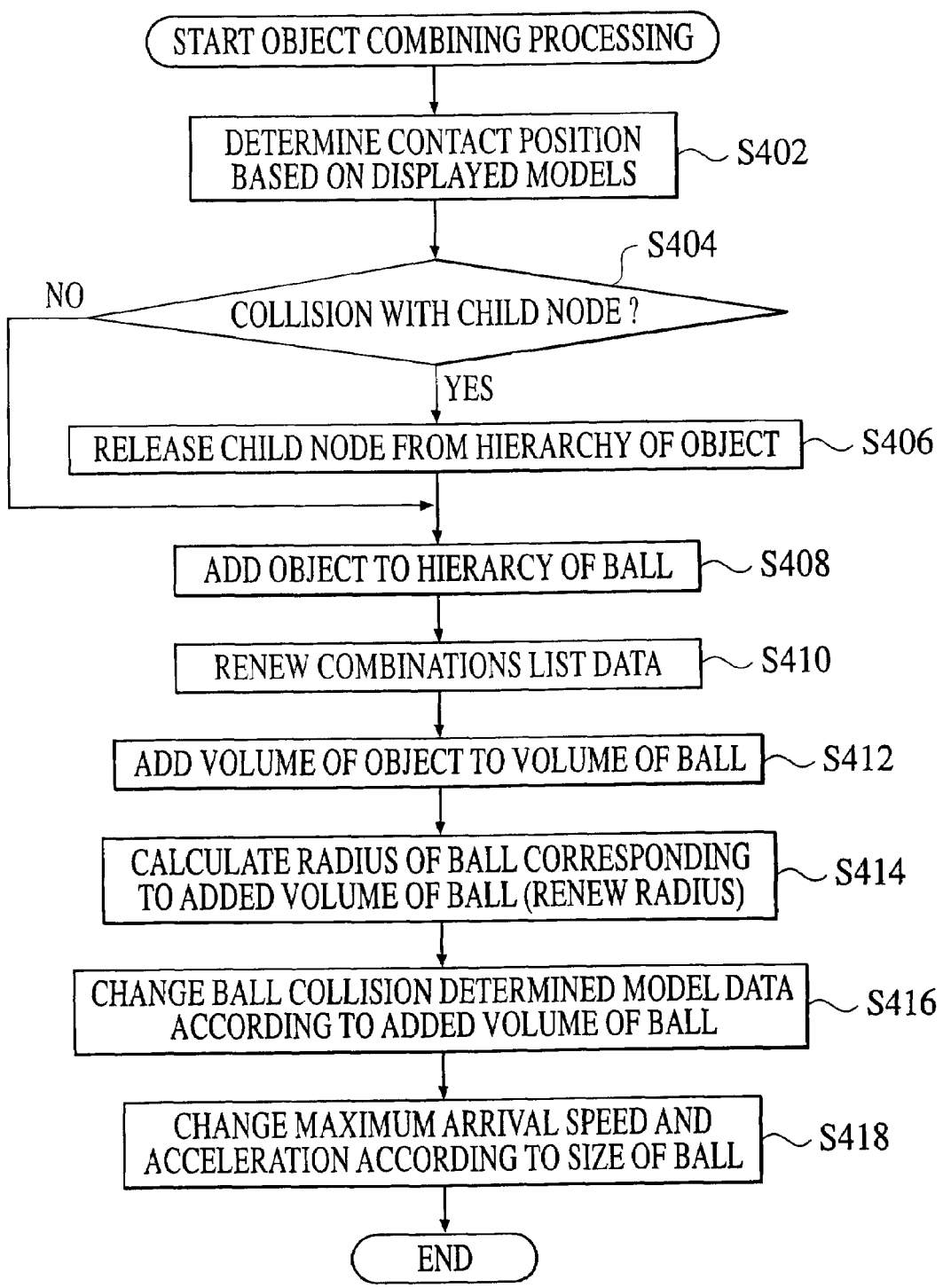
FIG. 11 is a flow chart for explaining a flow of an object combining processing.

FIG. 11 is a flow chart for explaining the flow of the object combining processing. According to the object combining processing, firstly, the object combining unit 223 determines coordinates of the position at which the object E contacts with the ball B, on the basis of the ball displayed model data 61 of the ball B and the object displayed model data 72 of the object E with which the ball B comes into collision (Step S402).

Then, the object combining unit 223 determines whether the contact position is included in the child node of the object E or not, that is, whether the ball B comes into collision with the child node or not (Step S404). When determining that the ball B is contacted with the child node of the object E (Step S404; YES), the object combining unit 223 changes the object hierarchy data 71, and releases the chilled node from the hierarchy of the object E (Step S406). On the other hand, when determining that the ball B comes into collision with the parent node of the object E (Step S404; NO), the object combining unit 223 keeps the object hierarchy data 71.

That is, for example, in case of the signal M shown in FIG. 14A, when the ball B comes into collision with the signal head M2 which is the child node shown in FIG. 14B, the signal head M2 comes off the signal pole M1 (the child node is released and separated from the hierarchy of the object), and is combined with the ball B. On the other hand, when the ball comes into collision with the signal pole M1 which is the parent node shown in FIG. 14C, the whole signal M is combined with the ball B.

Then, the object combining unit 223 determines the ball B to be the parent level, and the object E to be the child level, adds the object E to the hierarchy of the ball B, and renews the ball hierarchy data 62 of the ball B based on the combined point which is the coordinates of the contact position determined in the Step S402 (Step S408). Further, the object combining unit 223 adds the combined object E to the combinations list data 65 and renews the combinations list data 65 (Step S410).

Then, the object combining unit 223 adds the volume 752 of the object parameter 75 of the newly combined object E, to the volume 644 of the ball B, and renews the ball parameter 64 (Step S412).

When renewing the volume of the ball B, the object combining unit 223 calculates the radius of the ball B corresponding to the renewed volume of the ball B, and renews the radius 643 (Step S414). Further, the object combining unit 223 changes the ball collision determined model data 63 so as to be the same volume as the renewed volume 644 of the ball B (Step S416).

Because the ball B is enlarged, the traveling ability determination unit 224 increases the maximum arrival speed 641 and the acceleration 642 of the ball B according to the radius 64 of the ball B (Step S418). According to the first embodiment, the traveling ability determination unit 224 increases the maximum arrival speed 641 and the acceleration 642 so that the relation between the quantity of the operation inputted through the game controller 1202 or 1204 and the moving quantity of the ball B on the game screen is always constant.

Thereafter, when the object combining unit 223 ends the object combining processing, the game processing comes back to the flow shown in FIG. 8A.

Coming back to the flow shown in FIG. 8A, in the Step S120, when the game operating unit 22 determines that the object E cannot be combined with the ball B (Step S120; NO), the game operating unit 22 determines that the ball B comes into collision with the obstacle. Therefore, the game operating unit 22 calculates the relative momentum "mv" between the ball B and the object E, with reference to the ball parameter 64 and the object parameter 75 (Step S122). Then, the object deformation unit 226 deforms the ball displayed model of the ball B according to the magnitude of the relative momentum "mv" (Step S124). The method for the collision deformation may adopt any known method as the occasion may demand.

Then, when the object combining unit 223 determines that the relative momentum "mv" is larger than the determined value (mv>determined value) (Step S126; YES), that is, the collision is hard, the object combining unit 223 executes the combination release processing, separates the object E which has been combined with the ball B from the ball B, and recreates the state the objects drops from the ball B by the collision (Step S128).

[Combination Release Processing]

FIG. 12 is a flow chart for explaining the flow of the combination release processing. According to the combination release processing, firstly, the object combining unit 223 determines the number "n" of objects to be separated from the ball B by releasing the hierarchy according to the relative momentum "mv" (Step S502). Then, the object combining unit 223 determines the angle coordinate value " " in the pole coordinate system, showing the range for selecting the object to be separated, according to the relative momentum "mv" (Step S504). The number "n" of objects and the angle "θ" are determined as the occasion may demand, in consideration of the limit.

Then, the object combining unit 223 determines the coordinates of the contact position "H" at which the object E is contacted with the ball B, on the basis of the ball displayed model data 61 of the ball B and the object displayed model data 72 of the object E which comes into collision with the ball B (Step S506).

When determining the contact position "H", the object combining unit 223 selects the objects E corresponding to the number "n", from the objects E which have already been combined with the ball B and are included within the range of the angle coordinate value "±θ" from the contact position "H", in the reverse order of the combination, with reference to the combinations list data 65 (Step S508). Then, the object combining unit 223 releases the hierarchies of the selected objects E, and separates the objects E from the ball B (Step S510). Thereafter, the object combining unit 223 deletes the registrations of the separated objects E from the combinations list data 65, and renews the combinations list data 65 (Step S512).

When separating the objects E from the ball B, the object combining unit 223 determines flying speeds of the objects E at random, and provides forces of flying according to the shock of the collision to the objects respectively (Step S514). Therefore, the separated objects E fly apart into pieces, and drop separately.

Figure 16A:
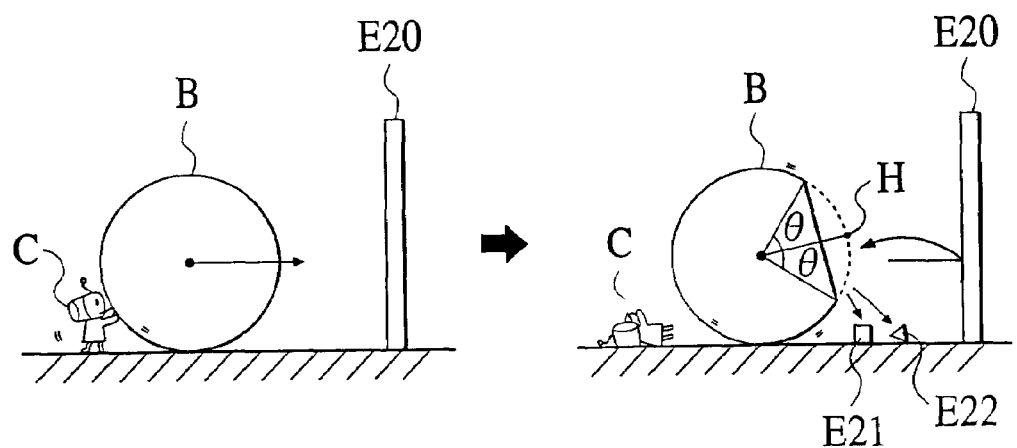
FIGS. 16A and 16B are conceptual views of a combination release processing and a deformation processing of the ball when the ball comes into collision.
Figure 16B:
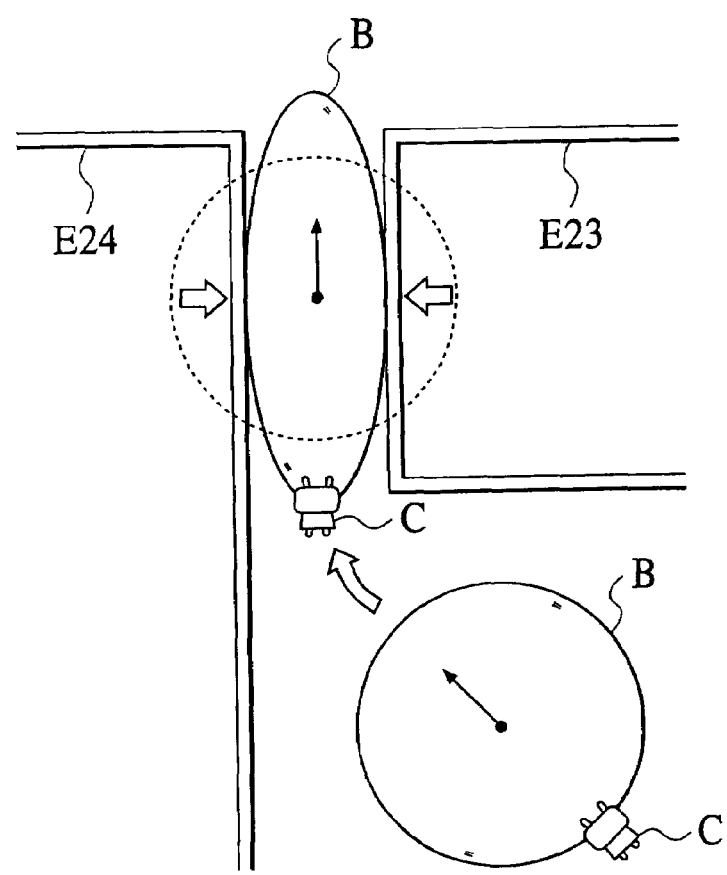

For example, in case the ball B comes into collision with the walls or the like, as shown in FIG. 16A, when one portion of the ball B comes into collision with the wall (object E20), only the portion which is within the angle "±θ" from the contact position "H" is deformed and broken into pieces, and objects E21 and E22 drop down. Further, for example, in case the ball B passes through the road surrounded with walls (objects E23 and E24), by force, as shown in FIG. 16B, if the ball B passes through the road slowly, because it is determined that the relative momentum "mv" is small, and the relative momentum "mv" is smaller than the determined value at the collision, in Step S126, it is possible that the ball B passes through the road without dropping objects E which are combined with the ball B.

Then, the object combining unit 223 reduces the volume 644 of the ball B by the volumes of the separated objects E (Step S516). When renewing the volume of the ball B, the object combining unit 223 calculates a radius of a sphere a volume of which is same as the renewed volume of the ball B, and renews the radius 643 (Step S518). Further, the object combining unit 223 enlarges and changes the ball collision determined model data 63 so that the volume of the ball collision determined model data 63 is the same as the renewed volume of the ball B (Step S520). Thereafter, the traveling ability determination unit 224 changes the parameter showing the traveling ability including the maximum arrival speed 641, the acceleration 642 and so on, according to the radius 643 of the ball B (Step S522). When the traveling ability determination unit 224 ends the change of the parameter and the object combining unit 223 ends the combination release processing, the game processing comes back to the flow shown in FIG. 8B.

Coming back to the flow shown in FIG. 8B, the game operating unit 22 executes a processing for changing the viewpoint to a proper viewpoint.

Firstly, the game operating unit 22 compares the present viewpoint determined value 531 with the proper determined value 532-2 related to the ball size range 532-1 corresponding to the radius 643 of the ball B, with reference to the viewpoint determined table 532 of the viewpoint data 53 (Step S132).

When determining that it is necessary to change the viewpoint in case the present viewpoint determined value 531 is different from the proper determined value 532-2 (Step S134; YES), the game operating unit 22 changes the viewpoint determined value 531 to the corresponding value of the proper determined value 532-2 (Step S136).

Then, the game operating unit 22 determines whether all objects E are displayed or not, individually, and changes the display determination data 76 of all object E, respectively, according to the display level 532-3 corresponding to the changed viewpoint, with the viewpoint determined table 532 (Step S138). Accordingly, in case of moving the viewpoint backward to display the larger range on the game screen, the small object E is not displayed on the game screen.

When changing the viewpoint and determining whether all objects E are displayed or not, the game operating unit 22 makes the image generating unit 24 generate and display the game screen (Step S140). That is, the image generating unit 24 obtains data of the object E to be provided in the present stage, with reference to the stage data 54, and displays the object E on the game screen when the display determination data 76 of the object E is "1".

Further, the game operating unit 22 may compare the object data 70 with the viewpoint data 53, and make the image generating unit 24 change the value of the object E and semitransparently display the object E, in case the viewpoint is in an inside of a building or a mountain.

Then, the game operating unit 22 determines the stage clear and the game over. First, the game operating unit 22 determines the ball B has gone over the slop SL dividing the stages STs or not, on the basis of the position coordinates of the ball B (Step S142).

When determining that the ball B has gone over the slope SL in the Step S142 (Step S142; YES), the game operating unit 22 resets the game play time (Step S150), and advances the game to the next stage (Step S152).

On the other hand, when determining that the ball B has not gone over the slop SL (Step S142; NO), the game operating unit 22 determines that the stage has not been cleared yet, and counts the game play time (Step S144).

When counting the game play time, the game operating unit 22 determines whether the game play time passes over the limited time or not (Step S146). When determining that the game play time passes over the limited time (Step 5146; YES), the game operating unit 22 executes a game over processing (Step S148). On the other hand, when determining that the game play time does not pass over the limited time (Step S146; NO), the game operating unit 22 goes on executing the game.

[Structure of Hardware]

Next, a hardware structure capable of realizing the present embodiment, will be explained with reference to FIG. 17, as follows.

Figure 17:
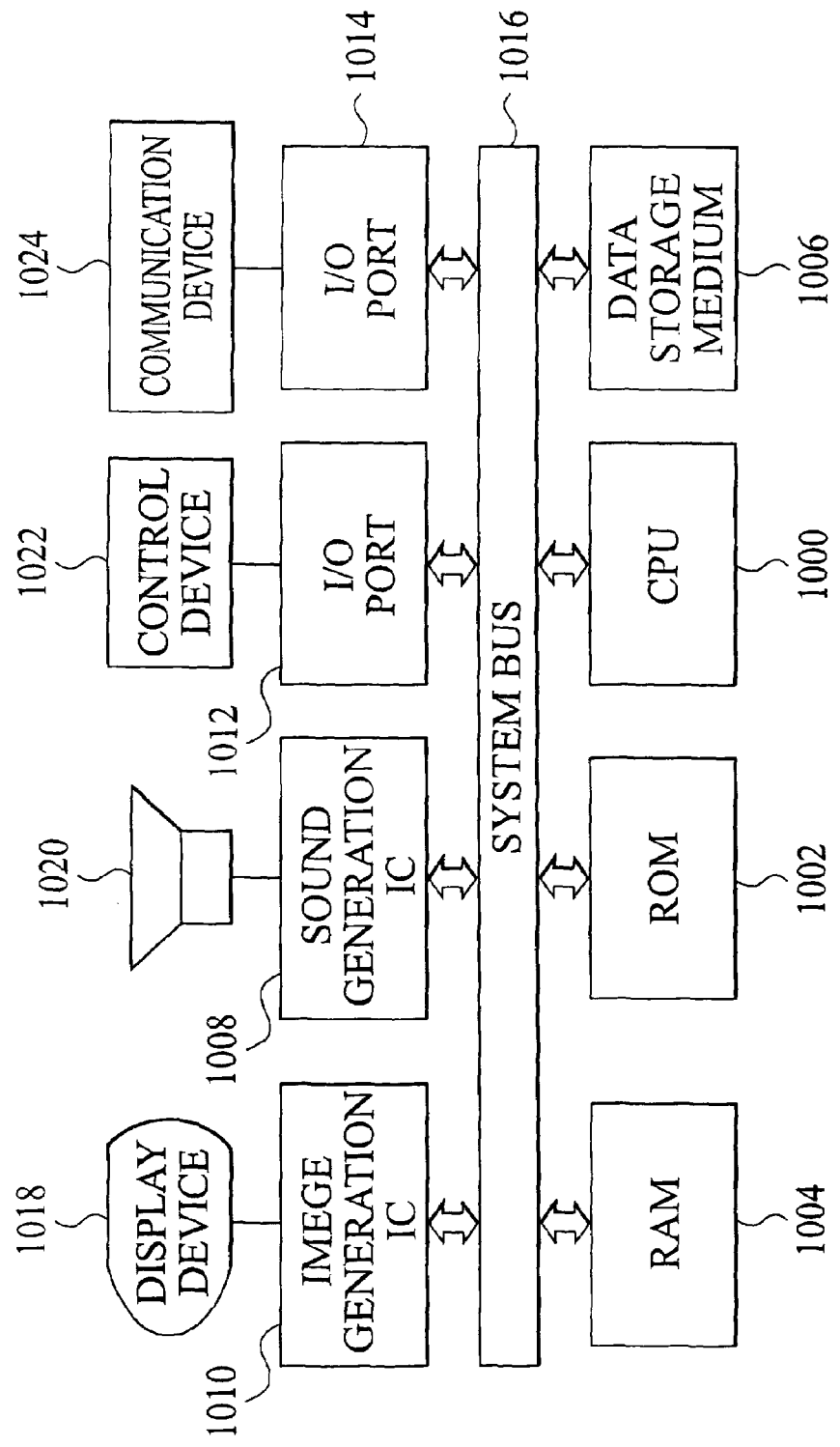
FIG. 17 is a block diagram showing an example of a hardware structure of the consumer game apparatus.

FIG. 17 is a diagram showing an example of the hardware structure according to the present embodiment. The apparatus as shown in FIG. 17 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween.

A speaker 1020 is further connected to the sound generation IC 1018, a display device 1018 is further connected to the image generation IC 1010, a control device 1022 is further connected to the I/O port 1012, and a communication device 1024 is further connected to the I/O port 1014.

The data storage medium 1006 corresponds to the storage medium 50 shown in FIGS. 5A and 5B. The data storage medium 1006 primarily stores data which are previously determined, including the program, image data, sound data or the like, or play data for recording the state the game progresses, therein. For example, the data storage medium 1006 stores the game data 52 shown in FIG. 5B.

In case the present invention is applied to the consumer game apparatus 1200, for example, the CD-ROM 1212, the IC memory 1214, the DVD or the like is used as the data storage medium for storing the game program. Further, the memory card 1216 or the like is used as the data storage medium for storing the play data. In case the present invention is applied to an arcade game machine, the IC memory such as a ROM or the like, or hard disc is used as the data storage medium. In the case, the data storage medium 1006 is realized by the ROM 1002.

The control device 1022 is equivalent to the operation unit 10 shown in FIG. 5A. The control device 1022 corresponds to the game controller 1202 or 1204 or the like shown in FIG. 1. Therefore, the control device 1022 is used so that a player inputs various operations according to the progress of the game to the apparatus body.

The CPU 1000 is equivalent to the processing unit 20 shown in FIG. 5A. The CPU 1000 controls the whole apparatus and performs various data processing, according to program stored in the data storage medium 1006, the system program stored in the ROM 1002, the operation signal inputted through the control device 1022, or the like.

The RAM 1004 is storage means used as a work area or the like, for the CPU 1000. Further, the RAM 1004 stores given data stored in the data storage medium 1006 or the ROM 1002, or results of the operation performed by the CPU 1000, therein.

The sound generation IC 1008 and the image generation IC 1010 are also disposed in such a type of game apparatus, to generate and output game sounds and game images appropriate to the game. The sound generation IC 1008 is an integrated circuit for generating game sounds such as sound effects, background music or the like, on the basis of data stored in the data storage medium 1006 or the ROM 1002. The game sounds generated by the sound generation IC 1008 are outputted from the speaker 1020. The image generation IC 1010 is an integrated circuit for generating pixel data required to output the images to the display device 1018, on the basis of image data outputted from the RAM 1004, the ROM 1002, the data storage medium 1006 or the like.

The display device 1018 corresponds to the display unit 30 shown in FIG. 5A. The display device 1018 can be realized by a CRT, a LCD, a PDP, an ELD or the like.

The communication device 1024 is a device for communicating various data used by the game apparatus with an external device. When the game apparatus is connected with another game apparatus, the communication device 1024 is used for communicating predetermined data corresponding to the game program, the game program or other data with another game apparatus, through the communications line.

Various processing explained with reference to FIGS. 8A to 12, is realized by the program for executing the processing, the data storage medium 1006 which stores the program, the CPU 1000, the image generation IC 1010, the sound generation IC 1018 or the like, which functions according to the program. The processing performed by the image generation IC 1010, the sound generation IC 1018 or the like, may be performed by the CPU 1000, a general DSP or the like, as a software.

The present invention can be applied to not only the consumer game apparatus 1200 shown in FIG. 1, but also various types of apparatuses such as an arcade game machine, a large-sized attraction apparatus permitting a large number of players to participate in a game, a multimedia terminal, an image generating apparatus, a system board for generating game images, or the like.

Figure 18:
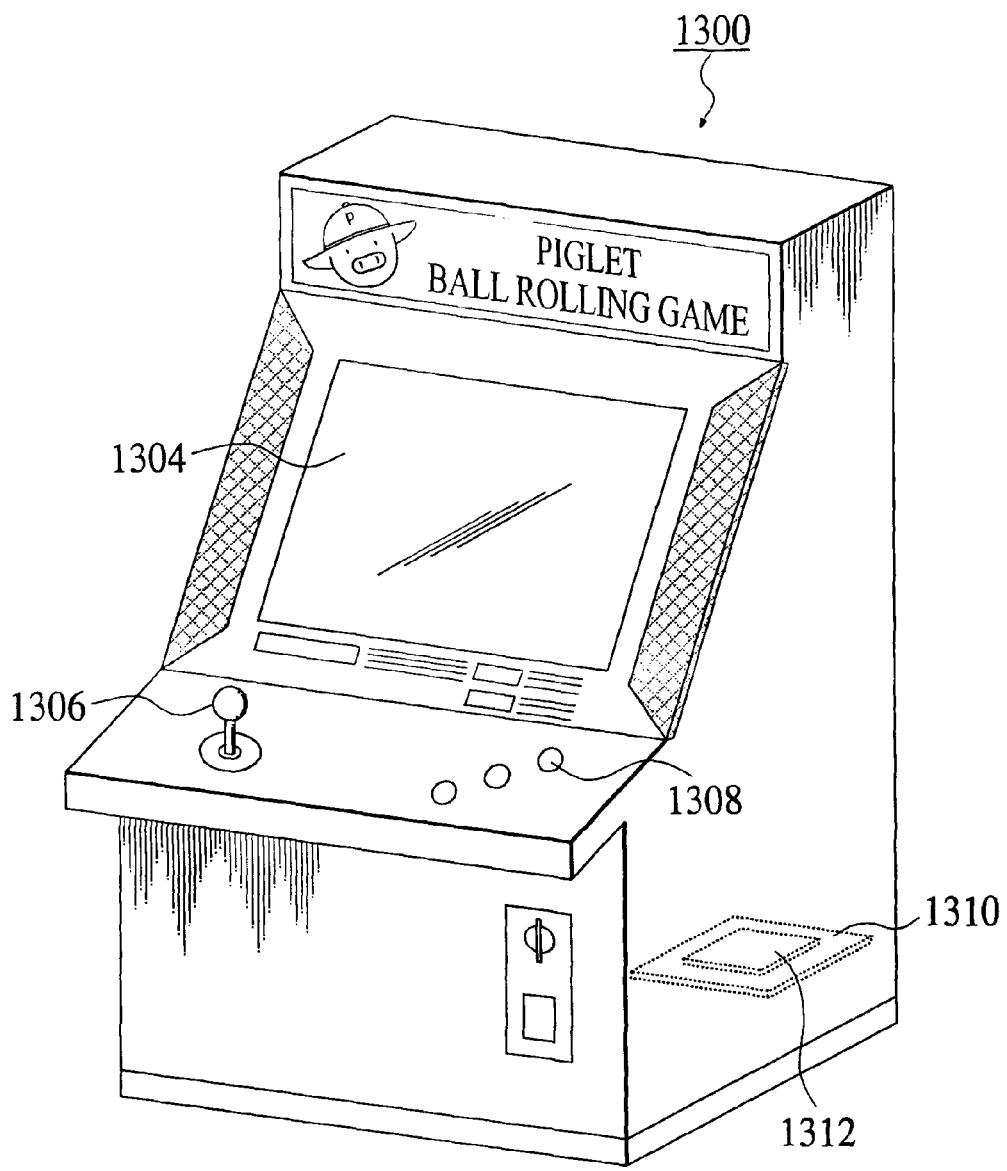
FIG. 18 is a view showing an example of a case the present invention is applied to an arcade game machine.

For example, FIG. 18 is a view showing an example of a case the present invention is applied to an arcade game machine 1300. In the arcade game machine 1300, a game screen is displayed on a display 1304. Therefore, a player can enjoy playing the game by inputting the moving direction of the ball B through a stick 1306, with watching the game screen.

Further, the CPU, the image generation IC, the sound generation IC or the like, is mounted on a system board 1310 incorporated in the arcade game machine 1300. The game data 52 is stored in a memory 1312 as a data storage medium mounted on the system board 1310.

Figure 19A:
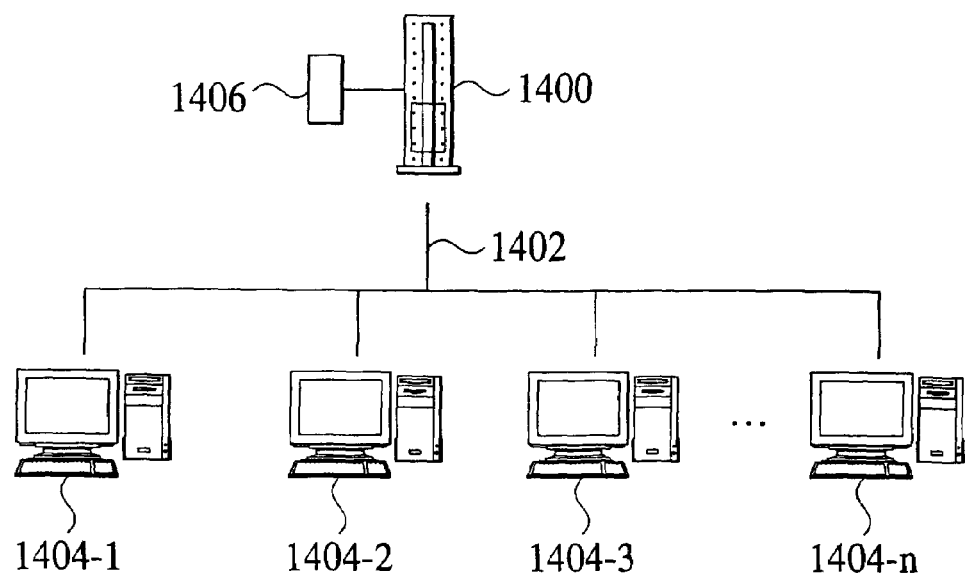
FIGS. 19A and 19B are views showing examples of cases the present invention is applied to game systems comprising apparatuses connected to each other through networks.
Figure 19B:
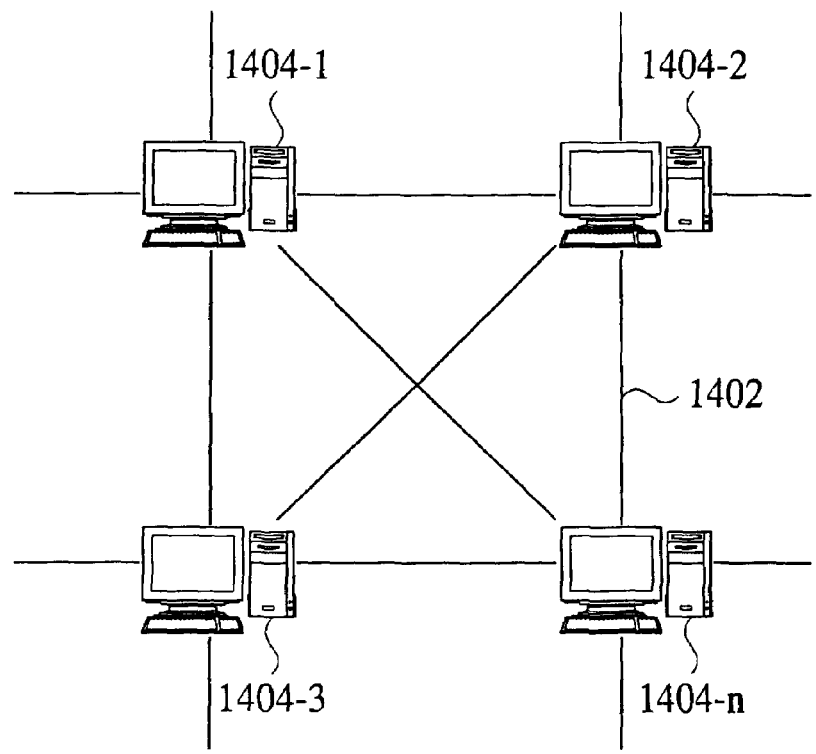

Further, FIGS. 19A and 19B are views showing examples of cases the present invention is applied to game systems each of which includes apparatuses connected to each other through a network.

In case of the structure shown in FIG. 19A, the game system comprises a host apparatus 1400 and terminals 1401-1 to 1404-$n$ connected to the host apparatus 1400 through a communication line 1402. In the case, the game data 52 is stored in a data storage medium 1406 such as a magnetic disc apparatus, a magnetic tape apparatus, an IC memory or the like, which can be controlled by the host apparatus 1400. In case each of the terminals 1404-1 to 1404-$n$ can generate game images and game sounds with standing alone, the host apparatus 1400 distributes the game program or the like for generating the game images and the game sounds, to the terminals 1404-1 to 1404-$n$. On the other hand, in case each of the terminals 1404-1 to 1404-$n$ cannot generate game images and game sounds with standing alone, the host apparatus 1400 generates game images and game sounds, and distributes them to the terminals 1404-1 to 1404-$n$. Therefore, each terminal can output the game images and the game sounds.

In case of the structure shown in FIG. 19B, there is not any apparatus corresponding to the host apparatus 1400. The terminals 1404-1 to 1404-$n$ are connected through the communication line 1402. Therefore, the means of the present invention are distributed among and executed by the terminals 1404-1 to 1404-$n$. Further, the programs or data for executing the means of the present invention may be distributed among and stored in data storage mediums of the terminals 1404-1 to 1404-$n$.

The terminal connected to the network, may be not only the above-described consumer game apparatus, but also a personal computer, an arcade game machine, a portable terminal such as a PDA or the like, or the like. In case an arcade game machine is connected to the network, as the terminal, the arcade game machine may have a structure capable of using a portable data storage device (a memory card, a portable game machine) which can communicate data between arcade game machines, and between the arcade game machine and the consumer game apparatus.

Although the present invention has been explained according to the above-described first embodiment, it should also be understood that the present invention is not limited to the first embodiment and various changes and modifications may be made to the invention without departing from the gist thereof.

For example, in the rotation control processing, the speed of the ball B is divided into the speeds of the right and left hemispheres, according to the embodiment. However, the speed of the ball B may determined by the cross key 1206 the upward and downward keys of which are directly connected with the inputs for moving the ball B in the forward and backward directions, respectively, and the buttons 1207b and 1207d which are directly connected with the inputs for moving the ball B in the rightward and leftward directions, respectively.

Further, the condition of clearing the stage is that the ball B goes over the predetermined slop, according to the embodiment. However, the condition may be that the player gathers a predetermined item (the player combines a predetermined item with the ball B) within the limited time. In order to realize the condition, it is determined whether the predetermined item is included in the objects E combined with the ball B or not, with reference to the combinations list data 65, in the Step S142 of FIG. 8B.

Further, it has been explained that the viewpoint is changed automatically, according to the embodiment. However, the viewpoint may be changed according to the operation inputted by the player. In order to realize the viewpoint, for example, it is determined whether the predetermined operation is inputted through the game controller 1202 or 1204, or not, in the Steps S132 and S134 of FIG. 8B.

[Second Embodiment]

Next, a second embodiment to which the present invention is applied will be explained with reference to FIGS. 20A to 23B. According to the second embodiment, an example of a game controller and so on, will be explained, the game controller which can emphasize a feeling of rolling the ball, which is characteristic of the present invention. The second embodiment can be basically realized by the same structure as the first embodiment. Therefore, the same reference numerals are attached to the same elements according to the second embodiment as the elements according to the first embodiment, and the same elements are omitted to be explained.

[External Appearance of the Input Device]

Figure 20A:
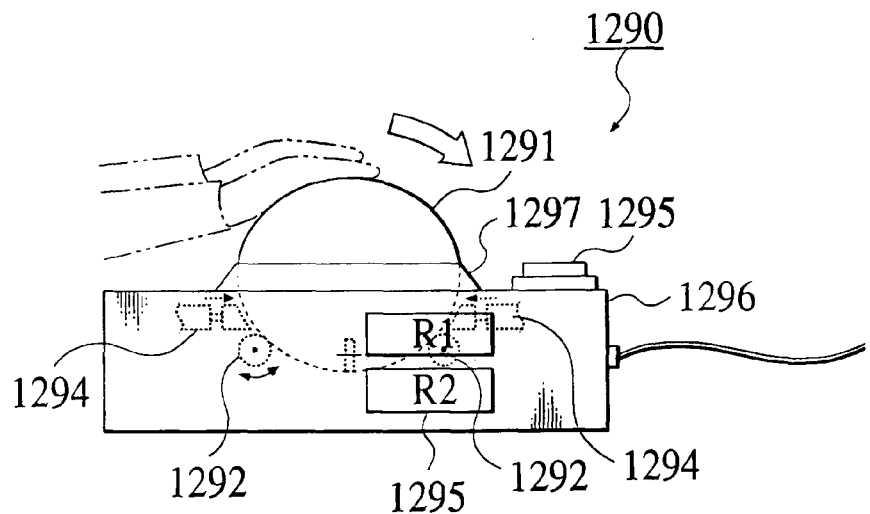
FIGS. 20A and 20B are a side view and a top plan view showing an example of an external appearance of a game controller according to a second embodiment of the present invention.
Figure 20B:
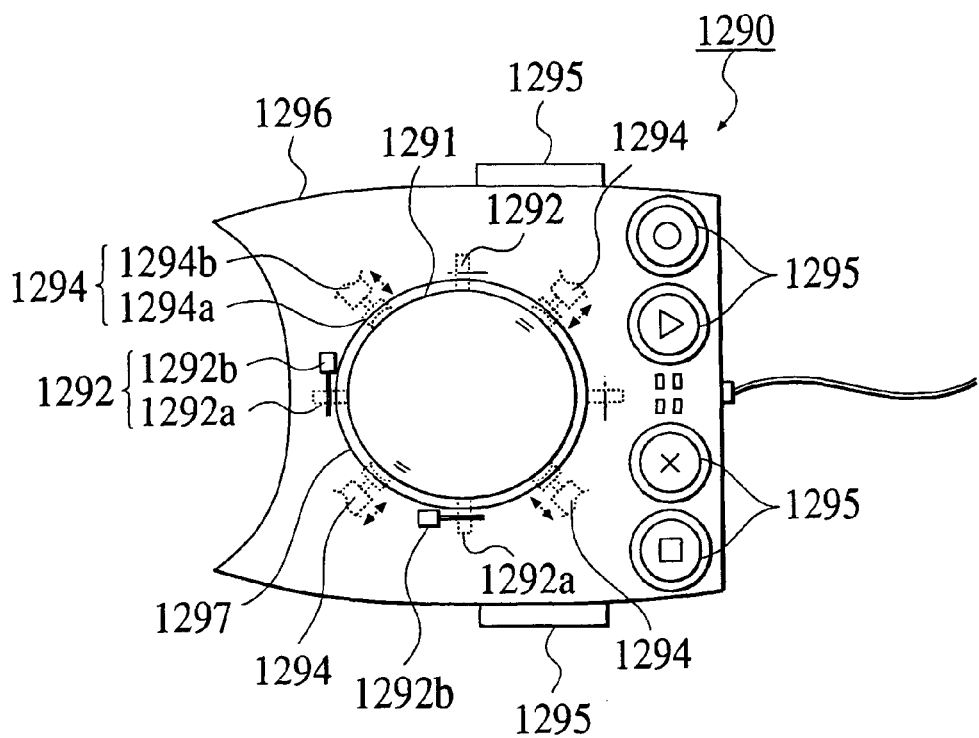

FIGS. 20A and 20B are a side view and a top plan view showing an example of an external appearance of a game controller 1290. The game controller 1290 comprises a controller covering body 1296, a ball unit 1291, a rotation detecting unit 1292, a rotation brake unit 1294, and various operation buttons 1295, wherein the ball unit 1291, the rotation detecting unit 1292, the rotation brake unit 1294 and the operation buttons 1295 are provided for the controller covering body 1296. The game controller 1290 is connected to the apparatus body 1210 and outputs various operations to the apparatus body 1210, like the game controller 1202 or 1204.

The ball unit 1291 is, for example, an approximate sphere made of resin, light metal or the like. The ball unit 1291 is an object of the operation for the game controller 1290, and associated with the ball B of the game. Preferably, the size of the ball unit 1291 is approximately palms of both hands. However, the size may be modified as the occasion may demand.

As shown in FIG. 20A, the ball unit 1291 is provided so that one portion of a surface of the ball unit 1291 is exposed from an opening formed at an upper surface of the controller covering body 1296, upward. Further, the ball unit 1291 is supported so as to rotate, by the rotation detecting unit 1292 from the downward, and is prevented from slipping or falling off from the controller covering body 1296, by a clip unit 1297.

The rotation detecting unit 1292 has a mechanism comprising, for example, a roller 1292a which is contacted with the ball unit 1291, and a rotation sensor 1292b for detecting a rotation of the roller 1292a, like a mouse or a track ball. The roller 1292a is contacted with the lower portion of the ball unit 1291. The rotation sensor 1292b detects the upward and downward rotation and the rightward and leftward rotation of the roller 1292a. Therefore, the rotation detecting unit 1292 outputs the detection signal to the apparatus body 1210, like the operation signal of the operation button 1295. The position at which the rotation detecting unit 1292 is provided, or the number of rotation detecting units 1292 provided for the controller covering body 1296, and the method for detecting the rotation are not limited to the above-described position or number, and the above-described method, respectively. The position or number and the method may be determined as the occasion may demand.

The rotation brake unit 1294 comprises a brake shoe 1294a and an actuator 1294b. The brake shoe 1294a is, for example, a friction brake unit made of rubber, synthetic resin, cloth, wood or the like. When the brake shoe 1294a is pressed on the surface of the ball unit 1291, by the actuator 1294b, the brake shoe 1294a brakes the rotation of the ball unit 1291 by the friction resistance. The actuator 1294b is an apparatus or a mechanism for driving according to the control signal outputted from the apparatus body 1210, and pressing the brake shoe 1294a on the ball unit 1291.

The position at which the rotation brake unit 1294 is provided, or the number of rotation brake units 1294 provided for the controller covering body 1296, may be determined according to various conditions including the design of the game controller 1290, the size of the ball unit 1291 and so on, as the occasion may demand. The type of the actuator 1294b may be determined as the occasion may demand.

[Explanation of Functional Block]

Next, the functional block according to the second embodiment, will be explained with reference to FIGS. 21A and 21B, as follows.

Figure 21A:
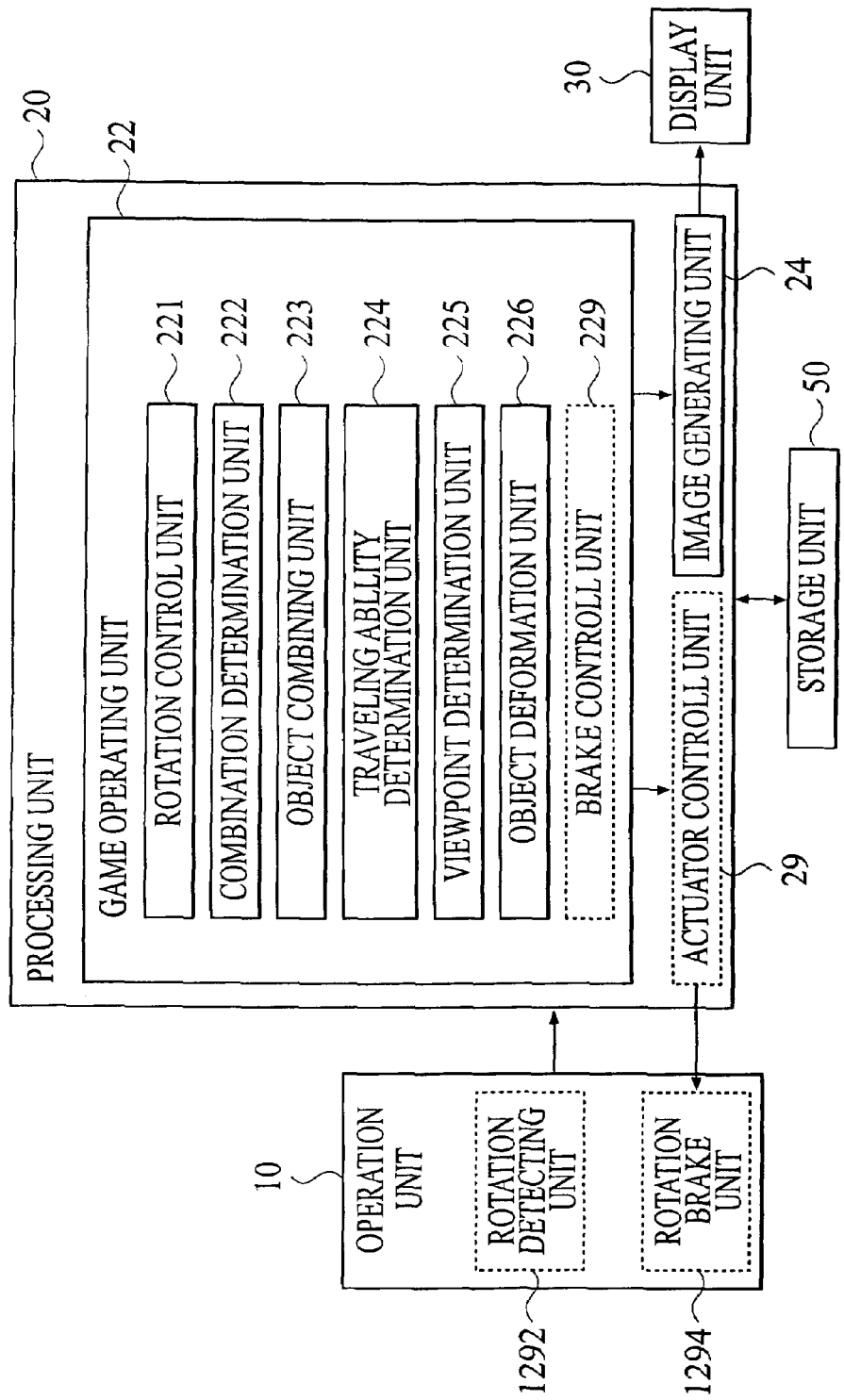
FIG. 21A is a block diagram showing an example of a functional structure according to the second embodiment.
Figure 21B:
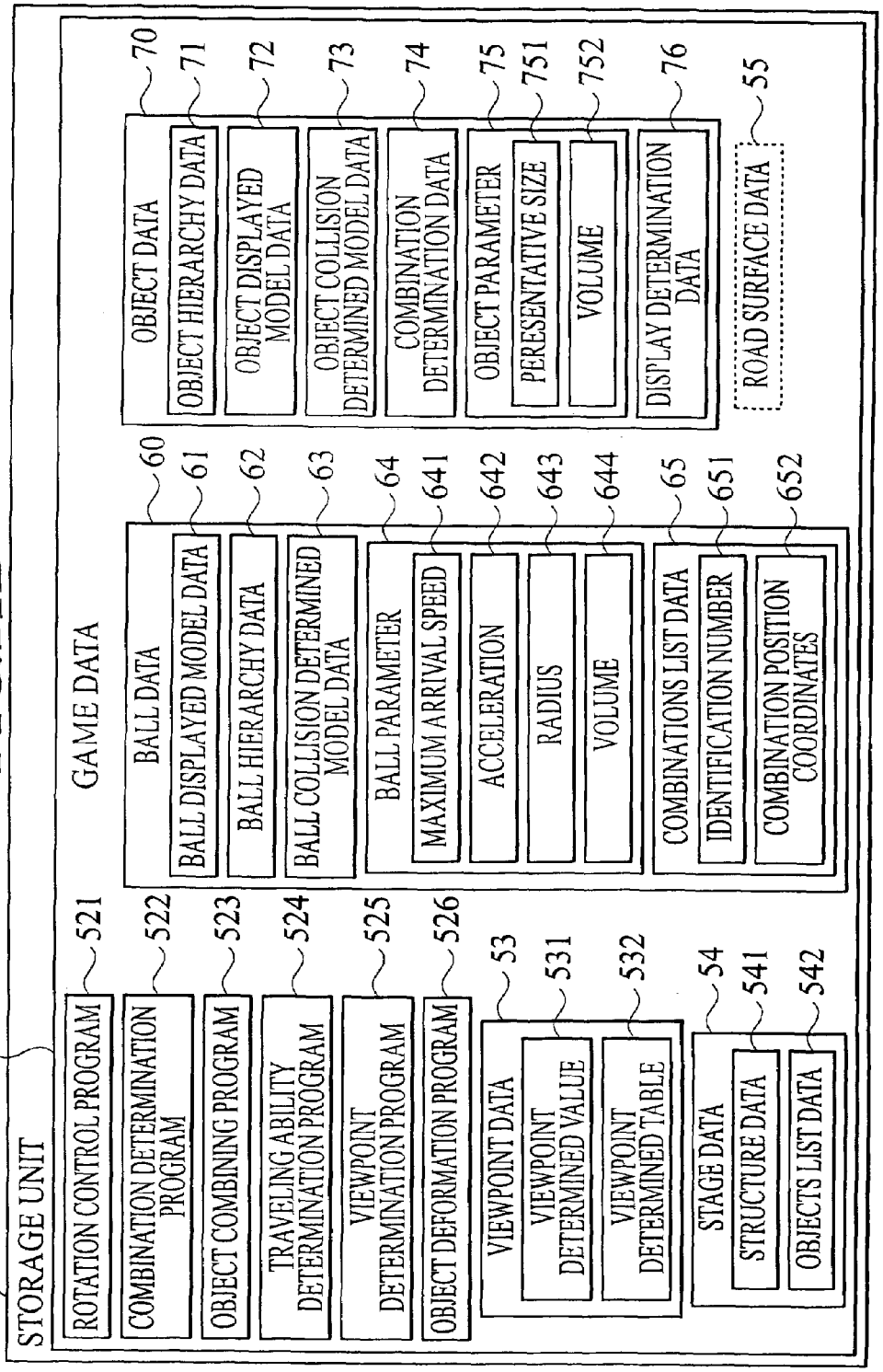
FIG. 21B is a block diagram showing an example of the storage unit 50 of the functional structure.

As shown in FIGS. 21A and 21B, the operation unit 10 comprises the rotation detecting unit 1292 and the rotation brake unit 1294. When the rotation detecting unit 1292 outputs the detection signal to the processing unit 20, the rotation control unit 221 uses the detection signal for the operation of the movement of the ball B.

The processing unit 20 further comprises an actuator control unit 29 for generating a signal for driving the actuator 1294b of the rotation brake unit 1294. The actuator control unit 29 is suitably determined according to the method for using the actuator 1294b. The actuator control unit 29 outputs the control signal to the rotation brake unit 1294 to put on the predetermined brake according to the signal outputted from the game operating unit 22.

The game operating unit 22 further comprises a brake control unit 229. The control brake control unit 229 determines the quantity of brake in case the ball B comes into collision with the obstacle (object E determined to be not combined with the ball B), or according to the condition of the surface of the road. Then, the brake control unit 229 makes the actuator control unit 29 control the rotation brake continuously or continually, as the game progresses.

The game data 52 further comprise road surface data 55 for storing data on the condition of the surface of the road. The road surface data 55 relates characteristic data on the surface of the road in the whole town, for example, data on a classification, a slop or the like, of a paved road, a gravel road, a grass, a marshy place, or the like, to the quantity of braking the rotation or the pattern (the continuous, the continual, the random or the like) of braking the rotation, and stores them.

[Explanation of Flow]

Next, an example of the game processing in case of including the rotation brake processing, will be explained, as follows.

Figure 22A:
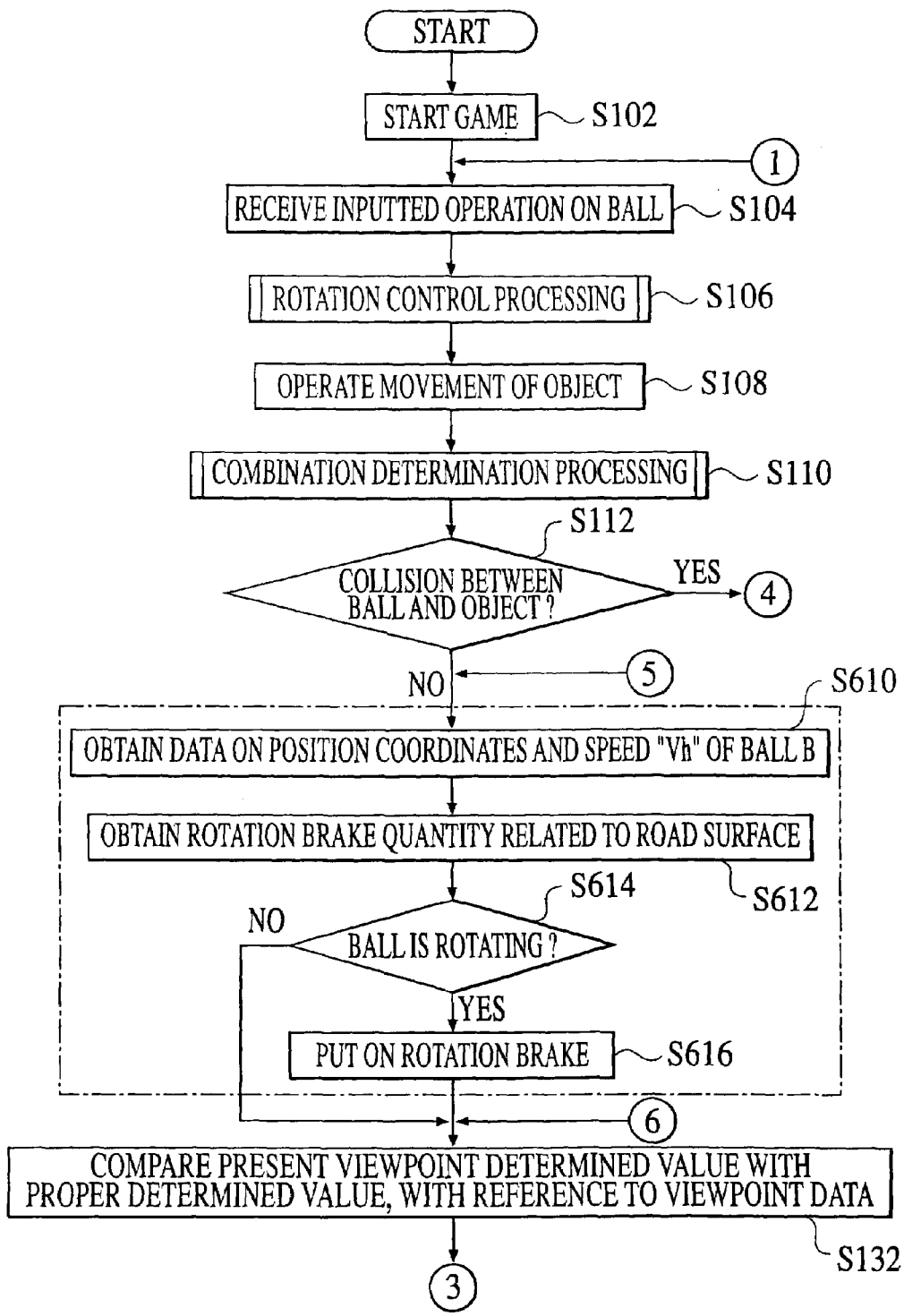
FIGS. 22A and 22B are flow charts for explaining a flow of a game processing, according to the second embodiment.
Figure 22B:
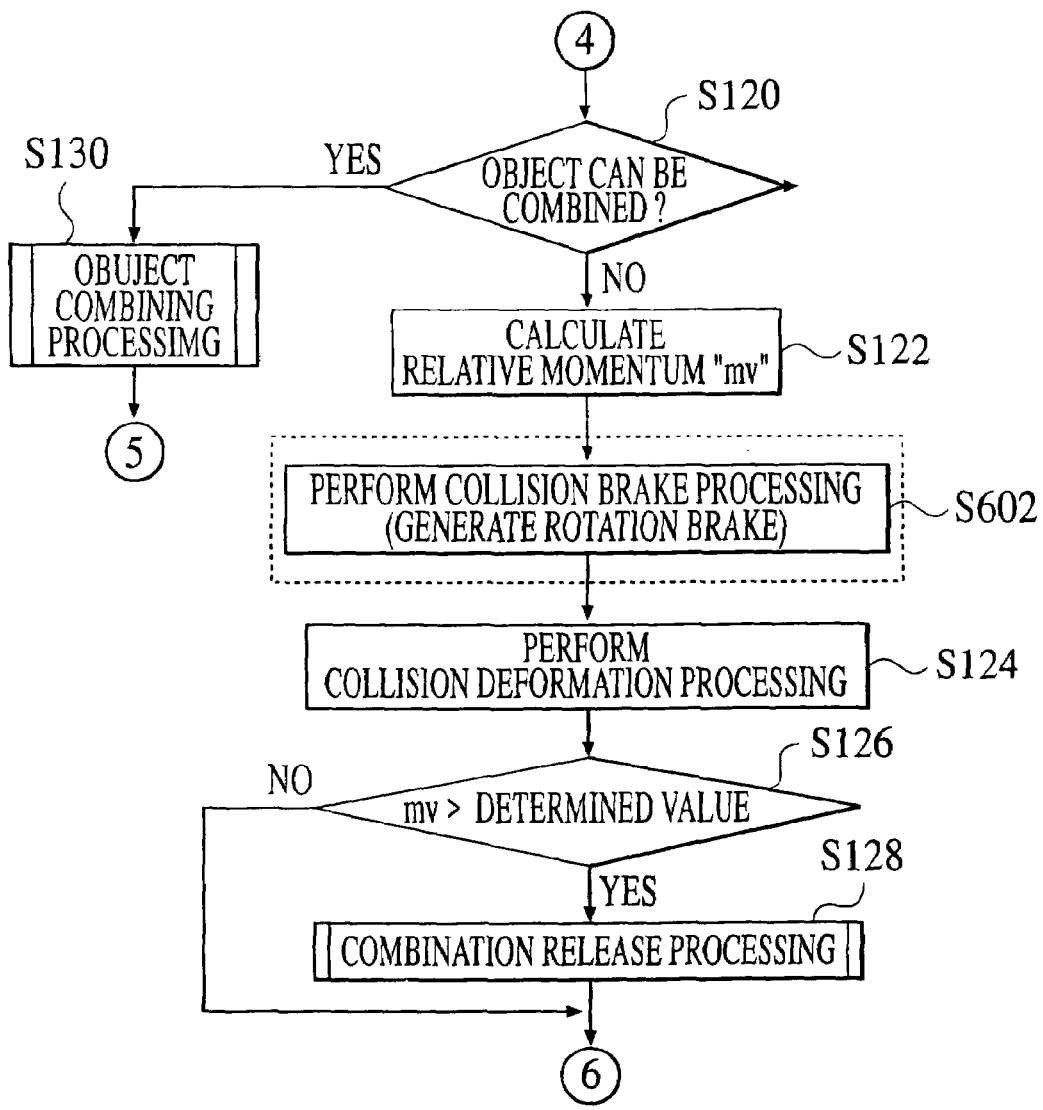

FIGS. 22A and 22B are flow charts for explaining the flow of the processing during the game according to the second embodiment. As shown in FIGS. 22A and 22B, the rotation brake processing is classified into a collision brake processing (surrounded with a broken line) which is executed when the ball B comes into collision with the obstacle, and a road surface resistance processing (surrounded with a one-dot broken line) which is executed when the ball B not comes into collision but rotates.

The collision brake processing is executed when it is determined that the ball B comes into collision with the obstacle object (the object E which is determined to be not combined with the ball B) (Step S120; NO).

More specifically, when the game operating unit 22 determines that the ball B comes into collision with the obstacle (the object E which is determined to be not combined with the ball B) (Step S120; NO), and calculates the relative momentum "mv" (Step S122), the brake control unit 229 generates the rotation brake in proportion to the relative momentum "mv" (Step S602). For example, the actuator 1294b presses the brake shoe 1294a on the ball unit 1291 for a short time, hardly, the brake shoe 1294a puts on the hard brake, brakes the rotation of the ball unit 1291 almost completely, and holds the ball unit 1292 braked for a predetermined time (for example, for about two seconds). Accordingly, because when the ball B comes into collision with the obstacle, the rotation of the ball unit 1291 is stopped, it is possible that the player feels the collision accident with hands.

The road surface resistance processing is executed when the ball B rotates without coming into collision with the object E (Step S112; NO).

More specifically, the brake control unit 229 obtains data on the position coordinates and the speed "Vh" of the ball B, with reference to the ball parameter 64 (Step S610). Then, the brake control unit 229 obtains data on the rotation brake quantity and the brake pattern related to the surface of the road on which the ball rotates, with reference to the road surface data 55 (Step S612).

Then, the brake control unit 229 refers the present speed of the ball B based on the ball parameter 64. When determining that the ball B is rotating in case the speed of the ball B is higher than the predetermined value (Step S614; YES), the brake control unit 229 makes the actuator control unit 29 brake according to the obtained rotation brake quantity (Step S616). At the time, for example, in case the rotation brake is to put on the continual brake, continuously, in order to express the bad road, the brake control unit 229 may change the pitch of the brake in proportion to the speed. On the other hand, when determining that the ball B keeps stop or is rotating around the center in case the speed of the ball B is lower than the predetermined value (Step S614; NO), the brake control unit 229 does not put on the rotation brake according to the surface of the road.

According to the above-described processing, it is possible that the player has a feeling when the ball B comes into collision with the obstacle, or when the ball B goes on the bad road, through the ball unit 1291. Consequently, it is possible that the player is absorbed in the game more.

As described above, according to the second embodiment, because the player pushes and rotates the ball unit 1291 with hands, in the tangent direction, so as to roll the ball, the player can enjoy having a feeling when the player rolls the ball B directly, more. Further, because the rotation brake unit 1294 brakes according to the movement of the ball B in the game, it is possible to transmit the feeling that the player operates the ball, to the player, more realistically. For example, in case the ball B comes into collision with the obstacle, it is possible to produce the collision by stopping the rotation of the ball unit 1291. Further, in case the ball B goes on the slope or the bad road, it is possible to produce the characteristic of the surface of the road, by putting the soft brake, or the continual brake.

Although an example of using the input means for emphasizing the feeling of rolling the ball, which is characteristic of the present invention has been explained according to the above-described second embodiment, the structure of the input means is not limited to the embodiment. The structure of the input means may be modified as the occasion may demand.

Figure 23A:
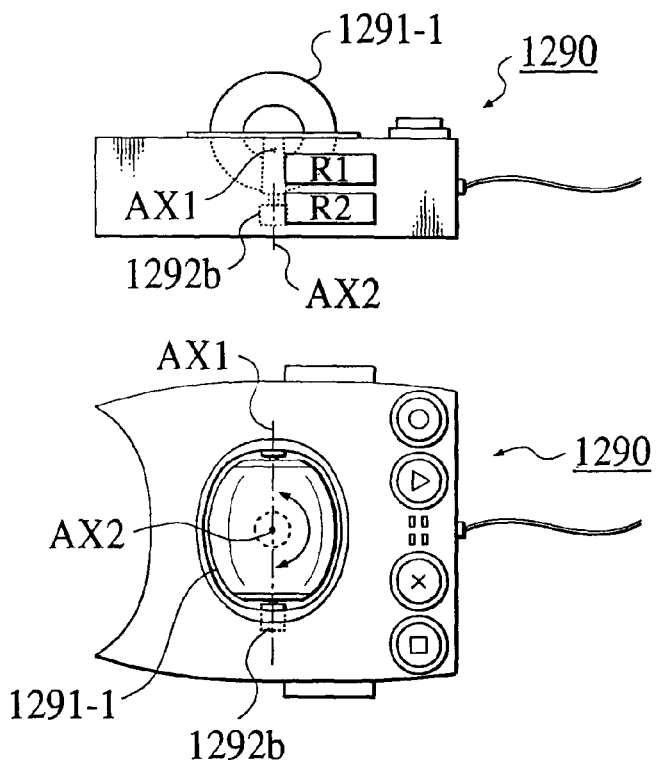
FIGS. 23A and 23B are views showing modifications on the game controller according to the second embodiment.

For example, although the ball unit 1291 is an approximate sphere according to the second embodiment, the ball unit is not limited to the sphere. As shown in FIG. 23A, the ball unit 1291 may an approximate column 1291-1 such as a barrel or the like, according to the determined condition of the ball B. In the case, rotation sensors 1292b may be provided for rotation axes AX1 and AX2, respectively, and detect rotations of the ball unit 1291-1.

Figure 23B:
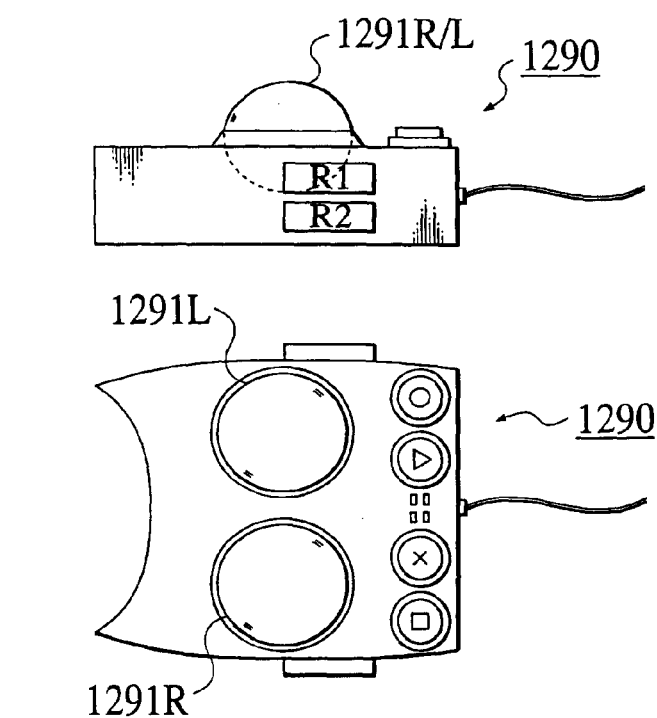

Further, as shown in FIG. 23B, the game controller 1290 may comprise two ball units 1291R and 1291L for inputting rotations of right and left hemispheres of the ball B, respectively (with reference to FIGS. 3A to 3C). Therefore, in order to rotate the ball B on the straight, the player is required to rotate the ball units 1291R and 1291L with both hand, in the approximately same way. Consequently, it is possible to determine the degree of difficulty in operating two ball units 1291R and 1291L, to be higher than one in operating one ball unit 1291 with one hand.

Further, the diameter of the ball unit 1291 is approximately the length of opened both hands according to the second embodiment. However, for example, the size of the ball unit 1291 may be a length of a fingertip such as a track ball, or a height of the player in order that the player operates the ball unit 1291 with both arms.

[Third Embodiment]

Next, the third embodiment to which the preset invention is applied will be explained with reference to FIGS. 24 to 26. According to the third embodiment, an example will be explained that a data storage medium comprising an inclination measurement function is installed in a portable game apparatus, and a player uses the portable game apparatus. The same reference numerals are attached to the same elements according the third embodiment as the elements according to the first embodiment, and the same elements are omitted to be explained.

[Explanation of Structure]

Figure 24:
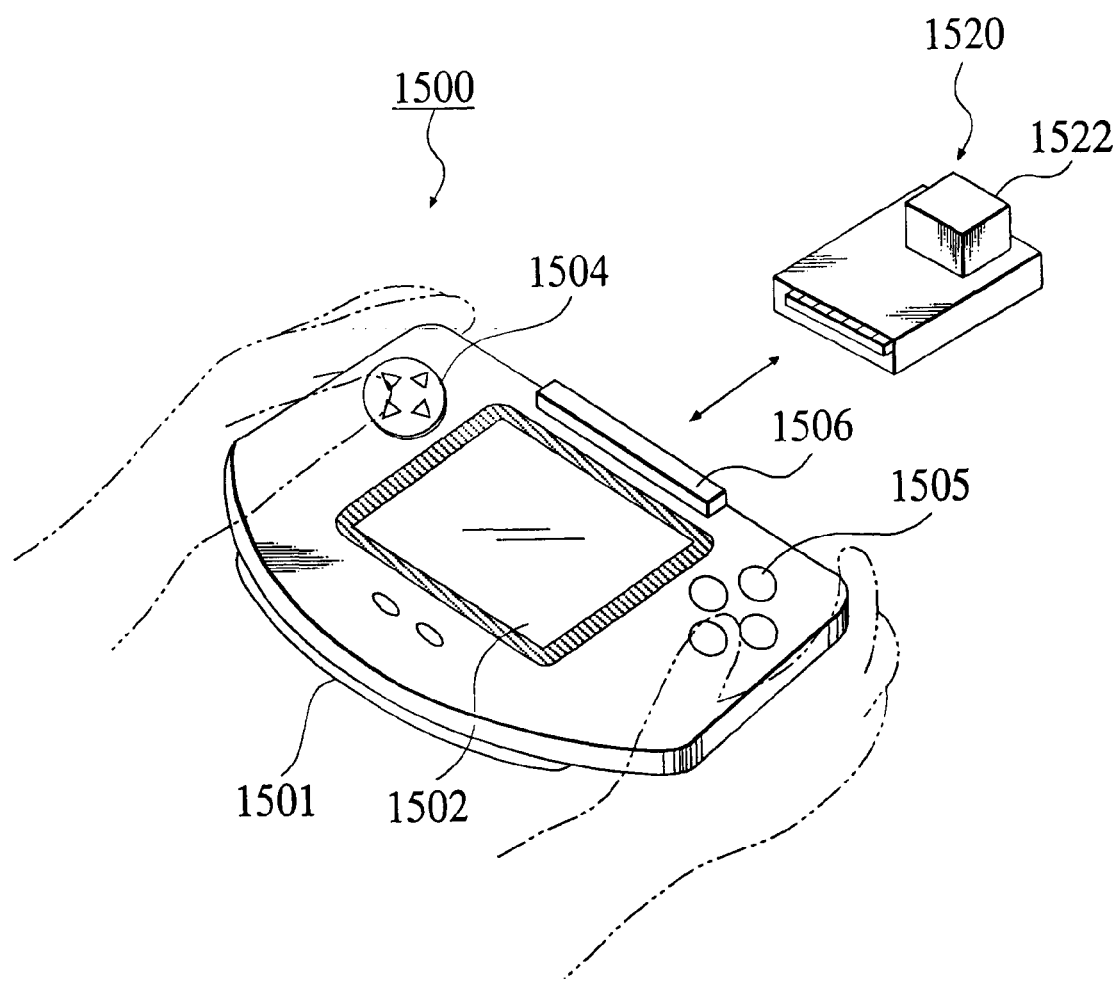
FIG. 24 is a view showing examples of external appearances of a portable game apparatus and a data storage medium according to a third aspect of the present invention.

FIG. 24 is a view showing an example of an external appearance of the portable game apparatus and the data storage medium according to the third embodiment.

The portable game apparatus 1500 comprises a display 1502, a cross key 1504, operation buttons 1505, and a memory card reader 1506 which are covered with a palm size of apparatus covering body 1501 covering a self-contained battery or an external power supply device (which is not shown in figures).

The display 1502 is, for example, a LCD, an ELD or the like, which can draw letters or figures or display images by dots.

The memory card reader 1506 is a data storage reading device which is equipped with and taken off a memory card 1520 with an inclination sensor as a data storage medium which stores game data including the game program, data or the like, required to execute the game.

The portable game apparatus 1500 executes various game processing and display the game screen on the display 1502, on the basis of game data read out of the memory card 1520 with the inclination sensor, and an operation signal inputted through the cross key 1504 and the operation buttons 1505. The player inputs the operation on moving the ball B by operating the cross key 1504 and the operation buttons 1505, and enjoys playing the game, with watching the game screen displayed on the display 1502.

According to the third embodiment, especially, the memory card 1520 with the inclination sensor is characterized by an inclination detecting device 1522. Therefore, when the player inclines the portable game apparatus 1500 which is equipped with the memory card 1520 with the inclination sensor, the player can control the rotation of the ball B.

The inclination detecting device 1522 is a sensor for detecting the inclination of the memory card 1520 with the inclination sensor. For example, the inclination detecting device 1522 is an acceleration sensor, an inclination sensor or the like. The inclination detecting device 1522 is provide in a body with the memory card 1520 with the inclination sensor. The data detected by the inclination detecting device 1522 is transmitted to the portable game apparatus 1500 through the memory card reader 1506. A method for detecting the inclination, and a type of sensor required to detect the inclination are selected from known combinations, as the occasion may demand.

[Explanation of Functional Block]

Next, the functional block according to the third embodiment, will be explained with reference to FIGS. 25A and 25B.

Figure 25A:
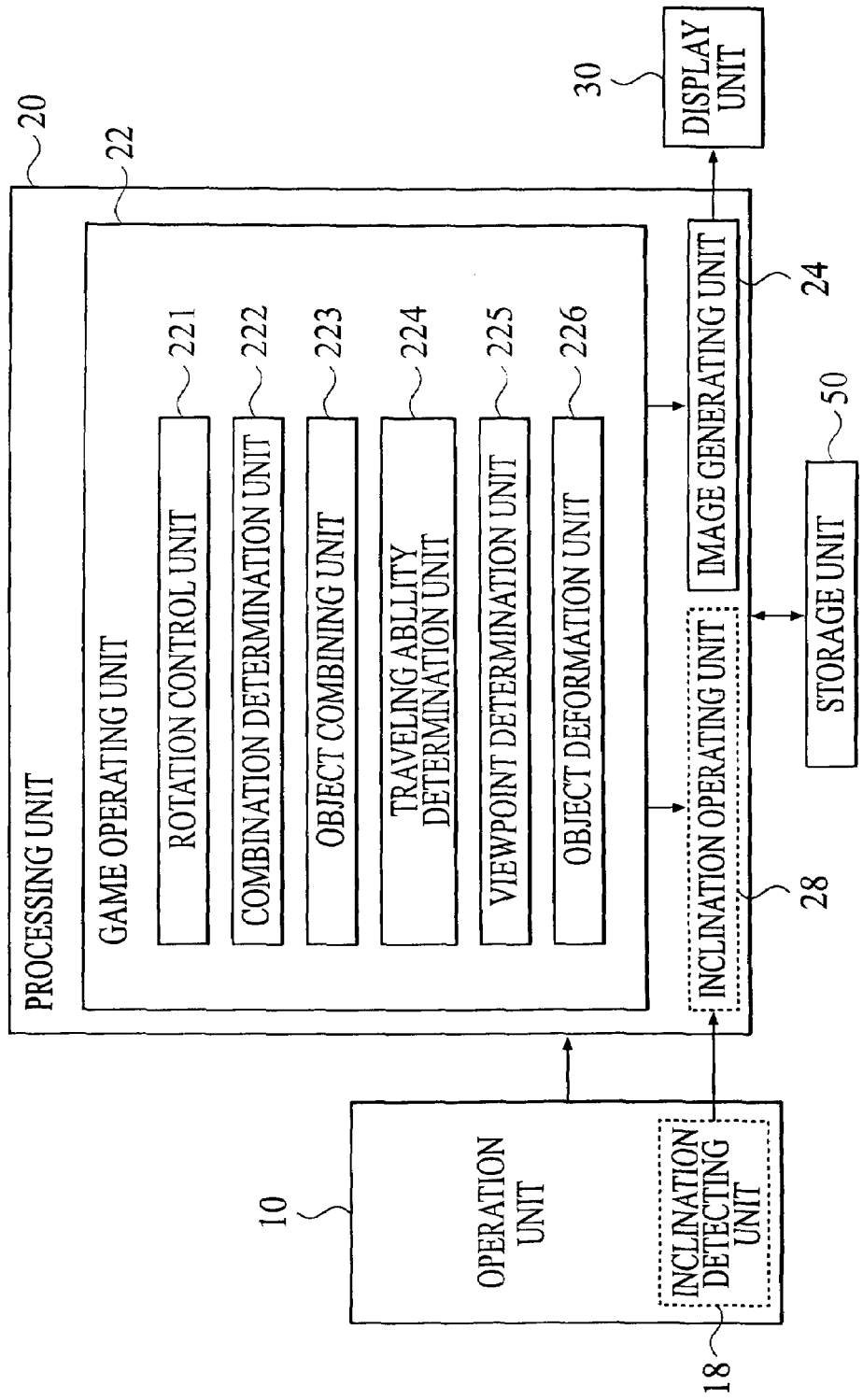
FIG. 25A is a block diagram showing an example of a functional structure according to the third embodiment.
Figure 25B:
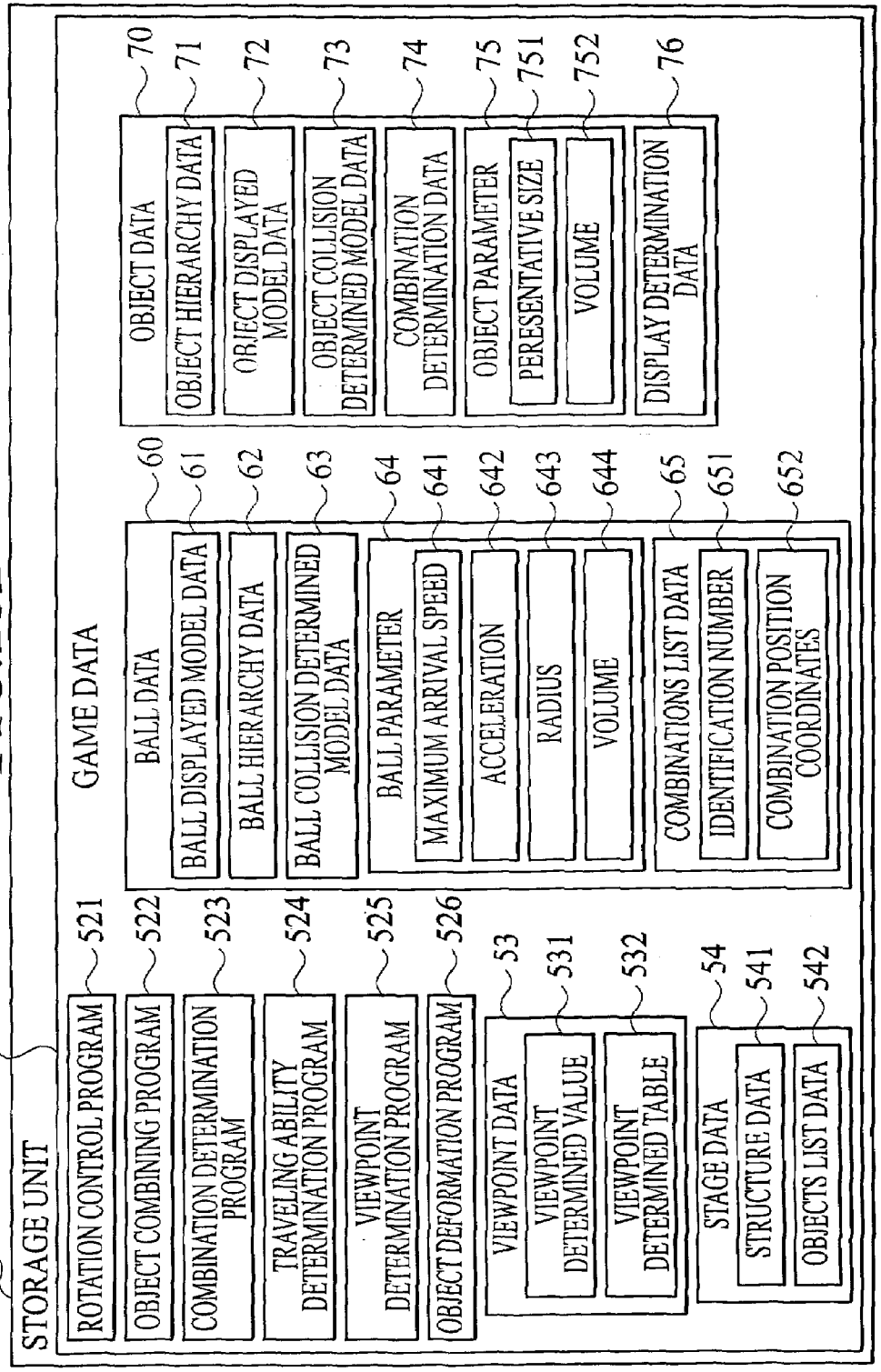
FIG. 25B is a block diagram showing an example of the storage unit 50 of the functional structure.

As shown in FIGS. 25A and 25B, the functional block composing the third embodiment, further comprises an inclination detecting unit 18 and an inclination operating unit 28.

The inclination detecting unit 18 corresponds to the inclination detecting device 1522 shown in FIG. 24.

The inclination operating unit 28 calculates the present inclination of the memory card 1520 with the inclination sensor, on the basis of the signal outputted from the inclination detecting unit 18. Then, the rotation control unit 221 operates the rotation of the ball B.

[Explanation of Operation Concept]

Next, the flow of the rotation control processing according to the third embodiment will be explained with reference to FIG. 26.

Figure 26:
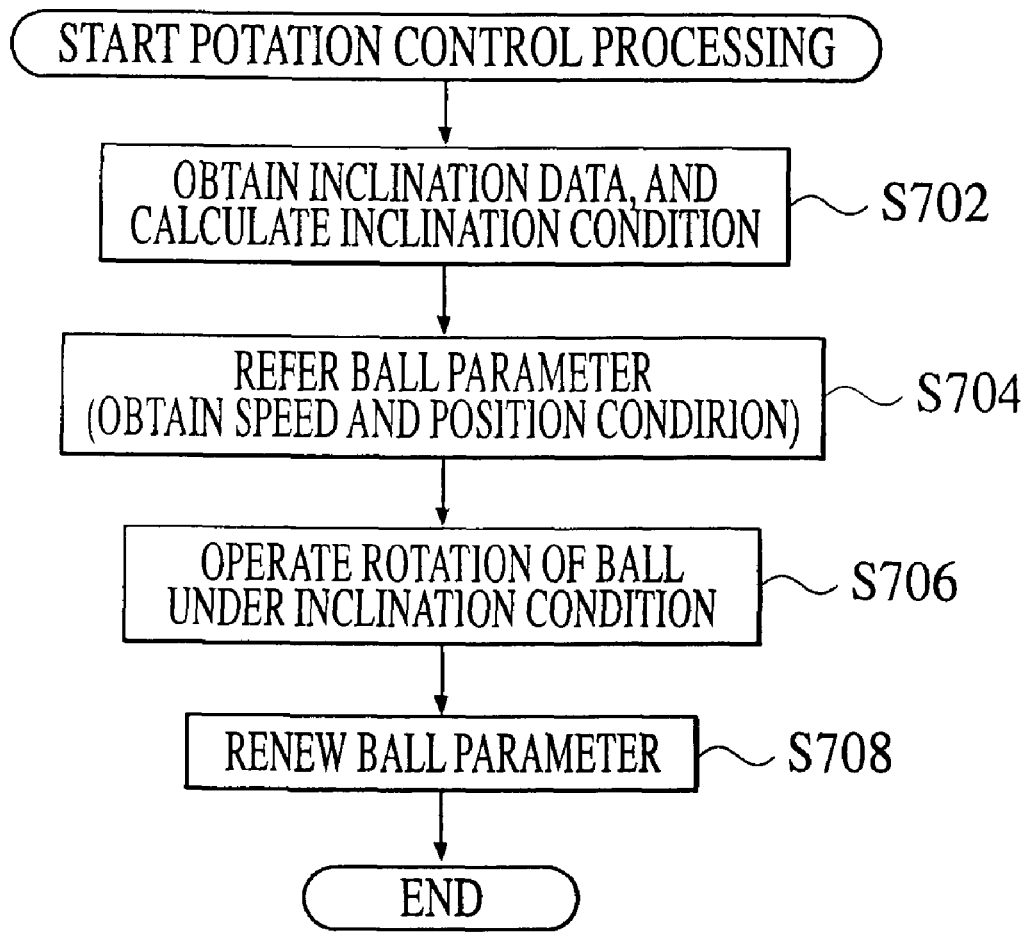
FIG. 26 is a flow chart for explaining a rotation control processing according to the third embodiment.

As shown in FIG. 26, the rotation control unit 221 obtains inclination data calculated by the inclination operating unit 28, and calculates the inclination condition (Step S702).

Then, the rotation control unit 221 obtains the position coordinates, the speed and acceleration of the present ball B, with reference the ball parameter 64 (Step S704). Thereafter, the rotation control unit 221 operates the rotation of the ball B under the inclination condition, based on the inclination data (Step S706). More specifically, the rotation control unit 221 determines the speed in proportion of the weight of the ball to the inclination, and rotates the ball.

When the rotation control unit 221 operates the rotation of the ball B, the rotation control unit 221 renews the ball parameter 64 (Step S708).

As described above, according to the third embodiment, when the player inclines the portable game apparatus 1500 which is equipped with the memory card 1520 with the inclination sensor, as shown in FIG. 24, it is possible to control the rotation of the ball B. Consequently, it is possible that the player has a feeling of rolling the ball B in the portable game apparatus 1500, and plays the game.

[Explanation of Modifications]

It may be that the following functions are provided based on the above-described first, second and third embodiments.

[First Modification]

For example, it is possible to determine congeniality for the combination of the ball B and the object E.

More specifically, for example, attribute data of the ball B are provided for the ball data 60, and attribute data of the object E are provided for the object data 70. The attribute data mean, for example, that iron can be combined with a magnet, but wood cannot be combined with a magnet. The combination capable or incapable of the combination is determined for between the ball B and the object E.

Therefore, according to the combination determination processing (as shown in FIG. 10), the combination determination unit 222 refers the attribute data of the ball B and the attribute data of the object E, and determines whether the ball B is combined with the object E or not, according to the combination. The determination according to the attribute may be performed instead of the determination according to the representative size (Steps S304 to S306), or may be performed with the determination according to the representative size.

Accordingly, for example, although the ball B can usually be combined with only the object E which is congenial to the ball B, when the ball B is combined with the predetermined item which is found, the attribute data of the ball B are changed, and the ball B can be combined with any attribute of the object E. Further, by contraries, for example, it is possible to provide the state that the combination of the ball B and the object E with which the ball B can be combined, is reduced, and it becomes difficult to combine the ball B with the object E, when the ball B is combined with the object E including oil. Consequently, it is possible to provide various states, and provide the varied development of the game.

[Second Modification]

Further, it is possible to divide the object E which is determined to be not combined with the ball B, into pieces, when the ball B comes into collision with the object E. More specifically, the game operating unit 22 performs the modeling of object E as the hierarchy of a plurality of elements, and stores the data in the object hierarchy data 71. Then, for example, the game operating unit 22 performs a processing for releasing the hierarchical structure and separating the object into pieces, according to the relative momentum "mv", instead of the processing (Steps S124 to S128 in FIG. 8A) concerning the collision deformation.

Accordingly, it is possible to provide the state the ball B breaks even the object E which cannot be usually combined with the ball B, or which prevents the ball B from going forward, by the power, and goes forward. Consequently, it is possible to more effectively express a feeling that a player operates the huge object.

29

[Third Modification]

Further, in case a plurality of objects E are combined with the ball B, it is possible to simplify and display the objects E.

More specifically, for example, in case the number of objects E which are combined with the ball B, is over a predetermined value, with reference to the combinations list data 65, some objects E are not displayed in order that the combination position coordinates 652 are near the center of the ball B, or the ball displayed model data 61 is enlarged and displayed. As a result, it is possible to simply display the ball B and the objects E. Further, for example, the textures of the objects E are mapped on the surface of the ball B, in order that the combination position coordinates 652 are near the center of the ball B. As a result, it is possible to reduce the operation processing load.

[Fourth Modification]

Further, it is possible to change the BGM according to the tempo of the combination.

More specifically, for example, sound data are previously stored in the game data 52, for every part playing the BGM. Therefore, the sound generation IC 1008 changes and generates the BGM, by increasing or reducing the number of parts (for example, the number of types of musical instruments, the number of musical instruments, or the like) playing the BGM, according to the rate of increasing the combinations list data 65 per time.

According to the present invention, it is possible to realize a new game wherein when the operated object (first object) is rotated and moved in the game space, according to the operation of the player, and is contacted with another object, the object with which the operated object is contacted, is combined with the surface of the operated object as the center or as the initial state, and the operated object becomes large like a snowball. According to the game, it is possible that the player enjoys taking an unusual destruction which the player cannot take as in the past.

The entire disclosure of Japanese Patent Application No. Tokugan 2002-055112 filed on Feb. 28, 2002 including specification, claims, drawings and summary are incorporated herein by reference in its entirety.

What is claimed is:

1. A method that is implemented by a processor to generate an image of a virtual space and execute a predetermined game, the method comprising:
   disposing a plurality of objects in the virtual space;
   moving an operated object in the virtual space according to an input by a player;
   combining an object among the plurality of objects that has come in contact with the operated object when the object has not been combined with the operated object, and increasing a size of the operated object as the number of objects combined with the operated object increases;
   generating, via the processor, an image of the virtual space;
   determining whether or not an object among the plurality of objects can be combined with the operated object based on a relative relationship in size between the operated object and the object; and
   combining an object among the plurality of objects that has been determined to be combinable with the operated object when the object contacts with the operated object.

2. A method that is implemented by a processor to generate an image of a virtual space and execute a predetermined game, the method comprising:
   disposing a plurality of objects in the virtual space;
   moving an operated object in the virtual space according to an input by a player;

30 combining an object among the plurality of objects that has come in contact with the operated object when the object has not been combined with the operated object, and increasing a size of the operated object as the number of objects combined with the operated object increases;
   generating, via the processor, an image of the virtual space;
   controlling whether or not to display an object among the plurality of objects based on the size of the operated object.

3. The method as claimed in claim 2, wherein
   the controlling of whether or not to display an object among the plurality of objects includes not displaying an object, among the plurality of objects, that has a size equal to or smaller than a predetermined size based on the size of the operated object.

4. A method that is implemented by a processor to generate an image of a virtual space and execute a predetermined game, the method comprising:
   disposing a plurality of objects in the virtual space;
   moving an operated object in the virtual space according to an input by a player;
   combining an object among the plurality of objects that has come in contact with the operated object when the object has not been combined with the operated object, and increasing a size of the operated object as the number of objects combined with the operated object increases;
   generating, via the processor, an image of the virtual space; and
   controlling a viewpoint to follow the operated object while changing a distance between the viewpoint and the operated object based on the size of the operated object, and
   the generating of the image includes generating the image of the virtual space based on the viewpoint.

5. The method as claimed in claim 4, wherein
   the controlling of the viewpoint includes increasing the distance between the viewpoint and the operated object as the size of the operated object increases.

6. The method as claimed in claim 4, wherein
   the controlling of the viewpoint includes changing the distance between the viewpoint and the operated object so that an area of the image of the virtual space occupied by the operated object decreases when the area of the image of the virtual space occupied by the operated object has increased.

7. The method as claimed in claim 4, further comprising:
   not displaying an object among the plurality of objects that is equal to or smaller than a predetermined size threshold value; and
   increasing the size threshold value as the distance between the viewpoint and the operated object increases.

8. A game apparatus that generates an image of a virtual space and executes a predetermined game, the game apparatus comprising:
   a disposing section that disposes a plurality of objects in the virtual space;
   a movement control section that moves an operated object in the virtual space according to an input by a player;
   a combination control section that combines an object, among the plurality of objects, that has come in contact with the operated object when the object has not been combined with the operated object, and increases a size of the operated object as the number of objects combined with the operated object increases;
   an image generating section that generates an image of the virtual space; and
   a determining section that determines whether or not an object among the plurality of objects can be combined with the operated object based on a relative relationship in size between the operated object and the object, wherein the combination control section combines an object among the plurality of objects that has been determined to be combinable with the operated object when the operated object contacts with the object.

9. A game apparatus that generates an image of a virtual space and executes a predetermined game, the game apparatus comprising:

a disposing section that disposes a plurality of objects in the virtual space;

a movement control section that moves an operated object in the virtual space according to an input by a player;

a combination control section that combines an object, among the plurality of objects, that has come in contact with the operated object when the object has not been combined with the operated object, and increases a size of the operated object as the number of objects combined with the operated object increases;

an image generating section that generates an image of the virtual space; and a control section that controls whether or not to display an object among the plurality of objects based on the size of the operated object.

10. A game apparatus that generates an image of a virtual space and executes a predetermined game, the game apparatus comprising:

a disposing section that disposes a plurality of objects in the virtual space;

a movement control section that moves an operated object in the virtual space according to an input by a player;

a combination control section that combines an object, among the plurality of objects, that has come in contact with the operated object when the object has not been combined with the operated object, and increases a size of the operated object as the number of objects combined with the operated object increases;

an image generating section that generates an image of the virtual space; and a control section that controls a viewpoint to follow the operated object while changing a distance between the viewpoint and the operated object based on the size of the operated object, and the image generating section generating the image of the virtual space based on the viewpoint.

* * * * *